(12) United States Patent
Ito et al.

(10) Patent No.: US 8,290,887 B2
(45) Date of Patent: *Oct. 16, 2012

(54) LEARNING DEVICE, LEARNING METHOD, AND PROGRAM FOR IMPLEMENTING A PATTERN LEARNING MODEL

(75) Inventors: Masato Ito, Tokyo (JP); Kazumi Aoyama, Saitama (JP); Kuniaki Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 614 days.

This patent is subject to a terminal disclaimer.

(21) Appl. No.: 12/498,760

(22) Filed: Jul. 7, 2009

(65) Prior Publication Data

US 2010/0010949 A1    Jan. 14, 2010

(30) Foreign Application Priority Data

Jul. 9, 2008    (JP) ................................ P2008-178807

(51) Int. Cl.
*G06G 7/00*    (2006.01)
(52) U.S. Cl. ........................................................ 706/20
(58) Field of Classification Search .................. None
See application file for complete search history.

(56) References Cited

U.S. PATENT DOCUMENTS

2002/0178131 A1   11/2002  Tani

FOREIGN PATENT DOCUMENTS

JP    2002-024795    1/2002

OTHER PUBLICATIONS

Sugita et al., "Learning Semantic Combinatoriality from the Interaction between Linguistic and Behavioral Processes", Adaptive Behavior, vol. 13, No. 1, 33-52 (2005).*
Tani, "On the Interactions Between Top-Down Anticipation and Bottom-Up Regression", Nov. 2007, Frontiers in Neurorobotics, vol. 1, pp. 1-10.*
Xia et al, "A Cooperative Recurrent Neural Network Algorithm for Parameter Estimation of Autoregressive Signals", Oct. 2006, Neural Networks, pp. 2516-2522.*
Eiji Watanabe et al., "A Cooperative Learning Algorithm for Multi-Layered Neural Networks by using a PC Cluster" Institute of Electronics, Information and Communication Engineers technology memoir, Corporate judicial person Institute of Electronics, Information and Communication Engineers, Nov. 17, 2000, vol. 100, No. 466, pp. 79-86.

(Continued)

*Primary Examiner* — Jeffrey A Gaffin
*Assistant Examiner* — Paulinho E Smith
(74) *Attorney, Agent, or Firm* — Finnegan, Henderson, Farabow, Garrett & Dunner, L.L.P.

(57) ABSTRACT

A device for implementing a pattern learning model, the device including a plurality of learning modules, each of which performs update learning to update a plurality of model parameters of the pattern learning model that learns a pattern using input data. The device further including a model parameter sharing means for causing two or more learning modules from among the plurality of learning modules to share the model parameters; and a classification means for classifying the plurality of learning modules on the basis of the plurality of model parameters of each of the learning modules after the update learning.

7 Claims, 20 Drawing Sheets

OTHER PUBLICATIONS

Toshio Fukuda et al.,"A New Neuron Model for Additional Learning" Society of Instrument and Control Engineers memoirs, Corporate judicial person Society of Instrument and Control Engineers, Mar. 31, 1993, vol. 29, No. 3, pp. 356-364.

Notification of Reasons for Refusal, issued Jun. 10, 2010 with English language translation from the Japanese Patent Office in corresponding Japanese Patent application No. 2008-178807.

Y. Sugita et al., "Learning Semantic Combinatoriality from the Interaction between Linquistic and Behavioral Processes", Adaptive Behavor, vol. 13, No. 1, pp. 33-52 (2005).

Sammon, J., Jr., "A Nonlinear Mapping for Data Structure Analysis", IEEE Transactions on Computers, vol. C-18, No. 5, May 1969, pp. 401-409.

* cited by examiner

PATTERN P#1

PATTERN P#2

PATTERN P#3

PATTERN P#4

PATTERN P#5

LEARNING DEVICE, LEARNING METHOD, AND PROGRAM FOR IMPLEMENTING A PATTERN LEARNING MODEL

BACKGROUND OF THE INVENTION

1. Field of the Invention

The invention relates to a learning device, a learning method and a program and, more particularly, to a learning device, a learning method and a program that are able to obtain a pattern learning model having scalability and generalization capability.

2. Description of the Related Art

A pattern learning model that learns a pattern may be, for example, RNN (Recurrent Neural Network), RNNPB (Recurrent Neural Net with Parametric Bias), or the like. The scheme of learning of those pattern learning models is classified into a "local representation" scheme and a "distributed representation" scheme.

In the "local representation" scheme, a plurality of patterns are learned in each of a plurality of learning modules, each of which learns a pattern learning model (updates model parameters of a pattern learning model). Thus, one learning module stores one pattern.

In addition, in the "distributed representation" scheme, a plurality of patterns are learned in one learning module. Thus, one learning module stores a plurality of patterns at a time.

In the "local representation" scheme, one learning module stores one pattern, that is, one pattern learning model learns one pattern. Thus, there is a small interference in memory of a pattern between a learning module and another learning module, and memory of a pattern is highly stable. Then, the "local representation" scheme is excellent in scalability that it is possible to easily learn a new pattern by adding a learning module.

However, in the "local representation" scheme, one pattern learning model learns one pattern, that is, memory of a pattern is independently performed in each of a plurality of learning modules. Therefore, it is difficult to obtain generalization capability by structuring (commonizing) the relationship between respective memories of patterns of the plurality of learning modules, that is, it is difficult to, for example, generate, so to speak, an intermediate pattern, which differs from a pattern stored in a learning module and also differs from a pattern stored in another learning module.

On the other hand, in the "distributed representation" scheme, one learning module stores a plurality of patterns, that is, one pattern learning model learns a plurality of patterns. Thus, it is possible to obtain generalization capability by commonizing memories of a plurality of patterns owing to interference between the memories of the plurality of patterns in one learning module.

However, in the "distributed representation" scheme, stability of memories of patterns is low, so there is no scalability.

Here, Japanese Unexamined Patent Application Publication No. 2002-024795 describes that contexts of two RNNs are changed on the basis of an error between the contexts of two RNNs, one of which learns a pattern and the other one of which learns another pattern that correlates with the pattern to perform learning of the RNNs, and one of the contexts of the learned two RNNs is used as a context of the other RNN, that is, a context of one of the RNNs is caused to influence a context of the other one of the RNNs to generate output data (input data are input to an input layer of an RNN, and output data corresponding to the input data are output from an output layer of the RNN).

In addition, Yuuya Sugita, Jun Tani, "Learning Semantic Combinatoriality from the Interaction between Linguistic and Behavioral Processes", Adaptive Behavior, Vol. 13, No. 1, 33-52 (2005), describes that RNNPBs learn by changing PBs of the two RNNPBs on the basis of a difference between the PBs of the two RNNPBs, one of which learns a pattern of language and the other learns a pattern of action, and one of the PBs of the learned two RNNPBs is caused to influence the other PB to generate output data.

SUMMARY OF THE INVENTION

As described above, in learning of an existing pattern learning model, it is possible to obtain a pattern learning model having scalability or a pattern learning model having generalization capability; however, it is difficult to obtain a pattern learning model having both scalability and generalization capability at a time.

It is desirable to be able to obtain a pattern learning model having both scalability and generalization capability at a time.

According to an embodiment of the invention, a learning device includes: a plurality of learning modules, each of which performs update learning to update a plurality of model parameters of a pattern learning model that learns a pattern using input data; model parameter sharing means for causing two or more learning modules from among the plurality of learning modules to share the model parameters; and classification means for classifying the plurality of learning modules on the basis of the plurality of model parameters of each of the learning modules after the update learning.

According to another embodiment of the invention, a learning method includes the steps of: performing update learning to update a plurality of model parameters of a pattern learning model that learns a pattern using input data in each of a plurality of learning modules; causing two or more learning modules from among the plurality of learning modules to share the model parameters; and classifying the plurality of learning modules on the basis of the plurality of model parameters of each of the learning modules after the update learning.

According to further another embodiment of the invention, a program for causing a computer to function as: a plurality of learning modules that performs update learning to update a plurality of model parameters of a pattern learning model that learns a pattern using input data; model parameter sharing means for causing two or more learning modules from among the plurality of learning modules to share the model parameters; and classification means for classifying the plurality of learning modules on the basis of the plurality of model parameters of each of the learning modules after the update learning.

In the embodiment of the invention, update learning is performed to update a plurality of model parameters of a pattern learning model that learns a pattern using input data in each of a plurality of learning modules, and the model parameters are shared between two or more learning modules from among the plurality of learning modules. In addition, the plurality of learning modules are classified on the basis of the plurality of model parameters of each of the learning modules after the update learning.

DESCRIPTION OF THE PREFERRED EMBODIMENTS

Figure 1:
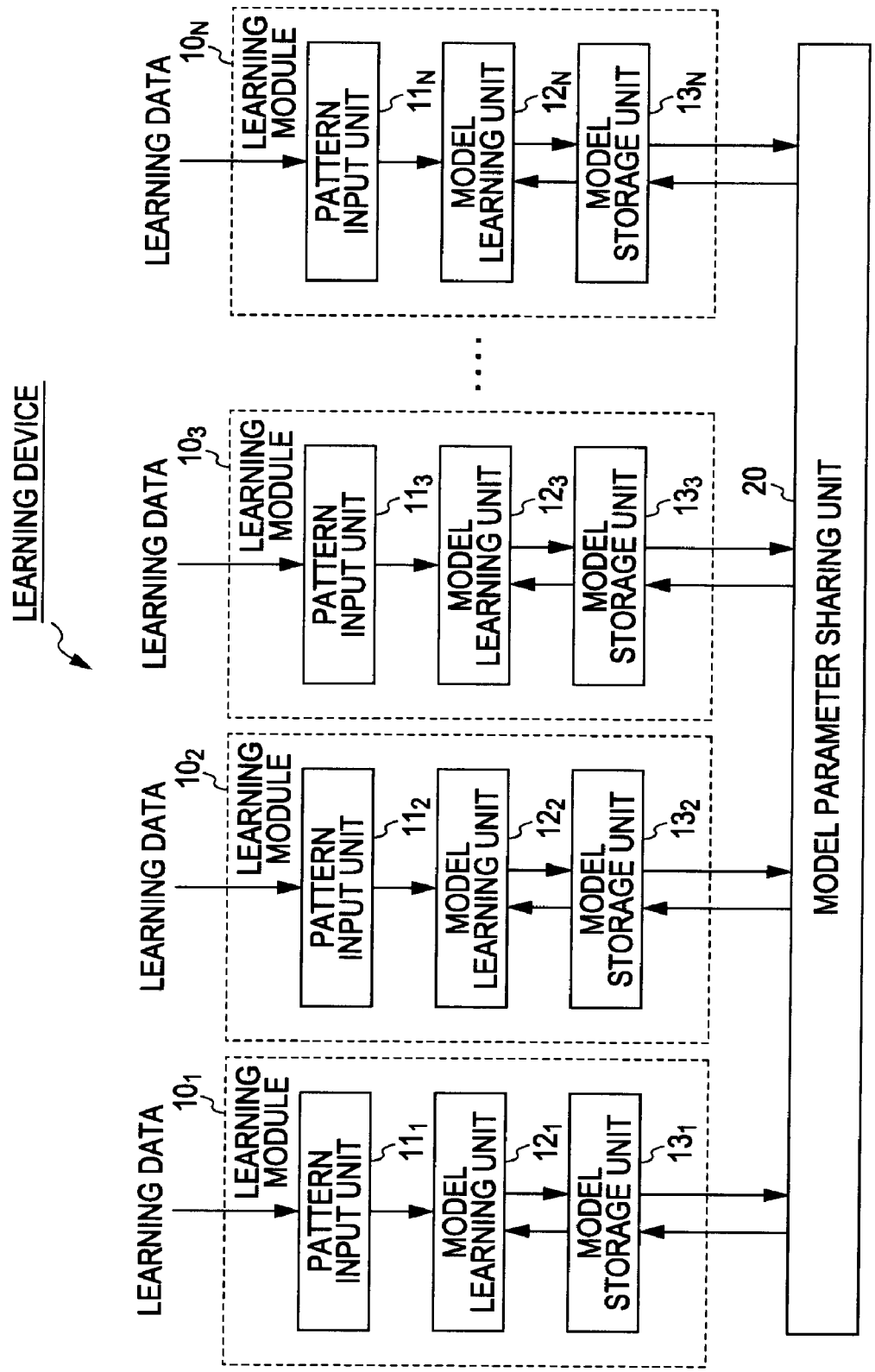
FIG. 1 is a block diagram that shows a configuration example of one embodiment of a learning device, which is a basic learning device to which an embodiment of the invention is applied.

FIG. 1 is a configuration example of one embodiment of a learning device, which is a base of a learning device to which an embodiment of the invention is applied.

As shown in FIG. 1, the learning device is formed of a plurality of N learning modules $10_1$ to $10_N$ and a model parameter sharing unit 20.

Each learning module $10_i$ (i=1, 2, . . . , N) is formed of a pattern input unit $11_i$, a model learning unit $12_i$ and a model storage unit $13_i$, and uses input data to perform update learning to update a plurality of model parameters (learning resources) of a pattern learning model.

That is, each pattern input unit $11_i$ is supplied with input data of a pattern (category) that a pattern learning model stored in the model storage unit $13_i$ acquires (learns) as learning data used for learning of the pattern learning model.

The pattern input unit $11_i$ converts the learning data supplied thereto into data in an appropriate format for learning of the pattern learning model, and then supplies the data to the model learning unit $12_i$. That is, for example, when learning data are time-series data, the pattern input unit $11_i$, for example, separates the time-series data in a fixed length and then supplies the separated time-series data to the model learning unit $12_i$.

The model learning unit $12_i$ uses the learning data supplied from the pattern input unit $11_i$ to perform update learning to update a plurality of model parameters of the pattern learning model stored in the model storage unit $13_i$.

The model storage unit $13_i$ has a plurality of model parameters and stores a pattern learning model that learns a pattern. That is, the model storage unit $13_i$ stores a plurality of model parameters of a pattern learning model.

Here, the pattern learning model may, for example, employ a model, or the like, that learns (acquires) (stores) a time-series pattern, which is a pattern in time series, or a dynamics that represents a dynamical system changing over time.

A model that learns a time-series pattern is, for example, an HMM (Hidden Markov Model), or the like, and a model that learns a dynamics is a neural network, such as an RNN, an FNN (Feed Forward Neural Network) and an RNNPB, or an SVR (Support Vector Regression), or the like.

For example, for an HMM, a state transition probability that indicates a probability at which a state makes a transition in the HMM and an output probability that indicates a probability at which an observed value is output from the HMM or an output probability density function that indicates a probability density when a state makes a transition are model parameters of the HMM.

In addition, for example, for a neural network, a weight assigned to an input to a unit (node), corresponding to a neuron, from another unit is a model parameter of the neural network.

Note that there are more than one state transition probability, output probability or output probability density function of an HMM and more than one weight of a neural network.

The model parameter sharing unit 20 performs sharing process to cause two or more learning modules from among the N learning modules $10_1$ to $10_N$ to share model parameters. As the model parameter sharing unit 20 performs sharing process, two or more learning modules from among the N learning modules $10_1$ to $10_N$ share model parameters.

Note that, hereinafter, for easy description, the model parameter sharing unit 20 performs sharing process to cause all the N learning modules $10_1$ to $10_N$ to share model parameters.

Next, the learning process in which the learning device shown in FIG. 1 learns a pattern learning model will be described with reference to the flowchart shown in FIG. 2.

In step S11, the model learning unit $12_i$ of each learning module $10_i$ initializes model parameters stored in the model storage unit $13_i$, for example, by random number, or the like, and then the process proceeds to step S12.

In step S12, the learning module $10_i$ waits until learning data to be learned by the learning module $10_i$ are supplied (input), and then uses the learning data to perform update learning to update the model parameters.

That is, in step S12, in the learning module $10_i$, the pattern input unit $11_i$, where necessary, processes the learning data supplied to the learning module $10_i$ and then supplies the learning data to the model learning unit $12_i$.

Furthermore, in step S12, the model learning unit $12_i$ uses the learning data supplied from the pattern input unit $11_i$ to perform update learning to update a plurality of model parameters of the pattern learning model stored in the model storage unit $13_i$, and then updates (overwrites) the content stored in the model storage unit $13_i$ by a plurality of new model parameters obtained through the update learning.

Here, the processes in steps S11 and S12 are performed in all the N learning modules $10_1$ to $10_N$.

After step S12, the process proceeds to step S13, and then the model parameter sharing unit 20 performs sharing process to cause all the N learning modules $10_1$ to $10_N$ to share the model parameters.

That is, when focusing on, for example, the mth model parameter from among a plurality of model parameters of the learning module $10_i$, the model parameter sharing unit 20 corrects the mth model parameter of the learning module $10_1$ on the basis of the respective mth model parameters of the N learning modules $10_1$ to $10_N$.

Furthermore, the model parameter sharing unit 20 corrects the mth model parameter of the learning module 102 on the basis of the respective mth model parameters of the N learning modules $10_1$ to $10_N$, and, thereafter, similarly, corrects the respective mth model parameters of the learning modules $10_3$ to $10_N$.

As described above, the model parameter sharing unit 20 corrects the mth model parameter of the learning module $10_i$ on the basis of the respective mth model parameters of the N learning modules $10_1$ to $10_N$. Thus, each of the respective mth model parameters of the N learning modules $10_1$ to $10_N$ is influenced by all the respective mth model parameters of the N learning modules $10_1$ to $10_N$ (all the mth model parameters of the N learning modules $10_1$ to $10_N$ influence each of the mth model parameters of the N learning modules $10_1$ to $10_N$).

In this way, all the model parameters of the plurality of learning modules influence each of the model parameters of the plurality of learning modules (each of the model parameters of the plurality of learning modules is influenced by all the model parameters of the plurality of learning modules). This is to share model parameters among the plurality of learning modules.

In step S13, the model parameter sharing unit 20 performs sharing process over all the plurality of model parameters stored in the model storage unit $13_i$ of the learning module $10_i$, and then updates the content stored in the model storage units $13_1$ to $13_N$ using the model parameters obtained through the sharing process.

After step S13, the process proceeds to step S14, and then the learning device shown in FIG. 1 determines whether the learning termination condition is satisfied.

Here, the learning termination condition in step S14 may be, for example, when the number of learning times, that is, the number of times steps S12 and S13 are repeated, reaches a predetermined number of times, when the update learning in step S12 is performed using all pieces of prepared learning data, or when, if a true value of output data to be output for input data has been obtained, an error of output data output from the pattern learning model for the input data with respect to the true value is smaller than or equal to a predetermined value.

In step S14, when it is determined that the learning termination condition is not satisfied, the process returns to step S12, and, thereafter, the same processes are repeated.

In addition, in step S14, when it is determined that the learning termination condition is satisfied, the process ends.

Note that the processes of step S12 and step S13 may be performed in reverse order. That is, it is applicable that, after the sharing process is performed to cause all the N learning modules $10_1$ to $10_N$ to share the model parameters, update learning is performed to update the model parameters.

Figure 3:
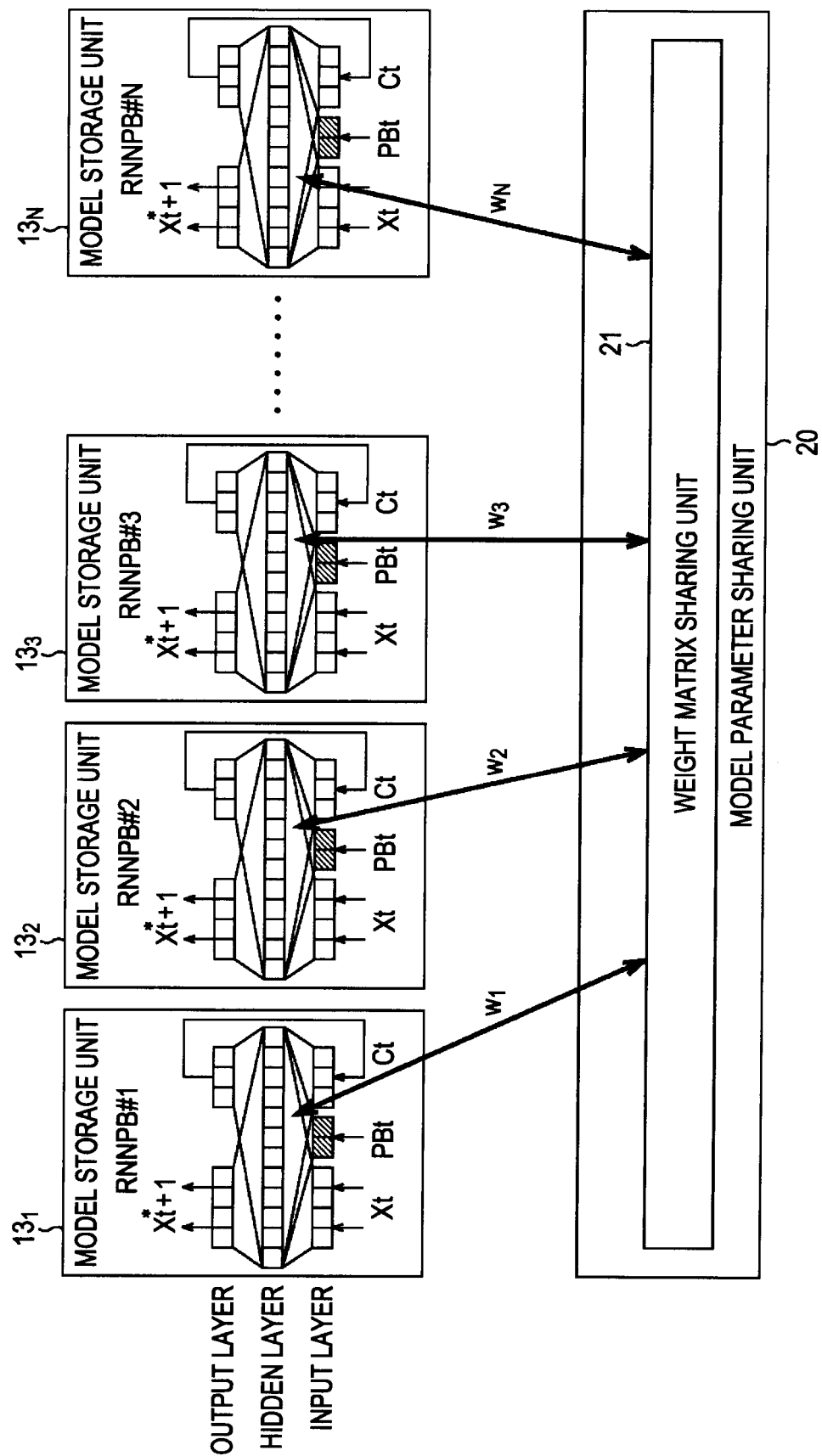
FIG. 3 is a block diagram that shows a configuration example of the learning device shown in FIG. 1 when RNNPBs are employed as pattern learning models.

Next, FIG. 3 shows a configuration example of the learning device shown in FIG. 1 when RNNPBs are employed as pattern learning models.

Note that in FIG. 3, the pattern input unit $11_i$ and model learning unit $12_i$ of each learning module $10_i$ are not shown.

Each model storage unit $13_i$ stores an RNNPB (model parameters that define an RNNPB). Hereinafter, the RNNPB stored in the model storage unit $13_i$ is referred to as RNNPB#i where appropriate.

Each RNNPB is formed of an input layer, a hidden layer (intermediate layer) and an output layer. The input layer, hidden layer and output layer are respectively formed of selected number of units corresponding to neurons.

In each RNNPB, input data $x_t$, such as time-series data, are input (supplied) to input units, which are a portion of units of the input layer. Here, the input data $x_t$ may be, for example, the characteristic amount of an image or audio, the locus of movement of a portion corresponding to a hand or foot of a robot, or the like.

In addition, a PB (Parametric Bias) is input to PB units, which are a portion of units of the input layer other than the input units to which the input data $x_t$ are input. With the PB, even when the same input data $x_t$ are input to RNNPBs in the same state, different output data $x^*_{t+1}$ may be obtained by changing the PB.

Output data output from a portion of units of the output layer are fed back to context units, which are the remaining units of the input layer other than the input units to which the input data $x_t$ are input as a context that indicates the internal state.

Here, the PB and context at time t, which are input to the PB units and context units of the input layer when input data $x_t$ at time t are input to the input units of the input layer are respectively denoted by $PB_t$ and $c_t$.

The units of the hidden layer operate weighted addition using a predetermined weight for the input data $x_t$, $PB_t$ and context $c_t$ input to the input layer, calculate a nonlinear function that uses the results of the weighted addition as arguments, and then outputs the calculated results to the units of the output layer.

As described above, output data of a context $c_{t+1}$ at the next time t+1 are output from a portion of units of the output layer, and are fed back to the input layer. In addition, a predicted value $x^*_{t+1}$ of the input data $x_{t+1}$ at the next time t+1 of the input data $x_t$ is, for example, output from the remaining units of the output layer as output data corresponding to the input data $x_t$.

Here, in each RNNPB, an input to each unit is subjected to weighted addition, and the weight used for the weighted addition is a model parameter of the RNNPB. Five types of weights are used as model parameters of the RNNPB. The weights include a weight from input units to units of the hidden layer, a weight from PB units to units of the hidden layer, a weight from context units to units of the hidden layer, a weight from units of the hidden layer to units of the output layer and a weight from units of the hidden layer to context units.

When the above RNNPB is employed as a pattern learning model, the model parameter sharing unit 20 includes a weight matrix sharing unit 21 that causes the learning modules $10_1$ to $10_N$ to share weights, which serve as the model parameters of each RNNPB.

Here, the plurality of weights are present as the model parameters of each RNNPB, and a matrix that includes the plurality of weights as components is called a weight matrix.

The weight matrix sharing unit 21 causes the learning modules $10_1$ to $10_N$ to share all the weight matrices, which are the plurality of model parameters of the RNNPB#1 to RNNPB#N and stored respectively in the model storage units $13_1$ to $13_N$.

That is, if the weight matrix of the RNNPB#i is denoted by $w_i$, the weight matrix sharing unit 21 corrects the weight matrix $w_i$ on the basis of all the weight matrices $w_1$ to $w_N$ of the respective N learning modules $10_1$ to $10_N$ to thereby perform sharing process to make all the weight matrices $w_1$ to $w_N$ influence the weight matrix $w_i$.

Specifically, the weight matrix sharing unit 21, for example, corrects the weight matrix $w_i$ of the RNNPB#i in accordance with the following equation (1).

$$w_i = w_i + \Delta w_i \quad (1)$$

Here, in equation (1), $\Delta w_i$ is a correction component used to correct the weight matrix $w_i$, and is, for example, obtained in accordance with equation (2).

$$\Delta w_i = \alpha_i \sum_{j=1}^{N} \beta_{ij}(w_j - w_i) \quad (2)$$

In equation (2), $\beta_{ij}$ denotes a coefficient that indicates a degree to which each weight matrix $w_j$ of the RNNPB#j (j=1, 2, ..., N) influences the weight matrix $w_i$ of the RNNPB#i.

Thus, the summation $\Sigma \beta_{ij}(w_j - w_i)$ on the right-hand side in equation (2) indicates a weighted average value of errors (differentials) of the respective weight matrices $w_1$ to $w_N$ of the RNNPB#1 to RNNPB#N with respect to the weight matrix $w_i$ using the coefficient $\beta_{ij}$ as a weight, and $\alpha_i$ is a coefficient that indicates a degree to which the weighted average value $\Sigma \beta_{ij}(w_j - w_i)$ influences the weight matrix $w_i$.

The coefficients $\alpha_i$ and $\beta_{ij}$ may be, for example, larger than 0.0 and smaller than 1.0.

According to equation (2), as the coefficient $\alpha_i$ reduces, sharing becomes weaker (the influence of the weighted average value $\Sigma \beta_{ij}(w_j - w_i)$ received by the weight matrix $w_i$ reduces), whereas, as the coefficient $\alpha_i$ increases, sharing becomes stronger.

Note that a method of correcting the weight matrix $w_i$ is not limited to equation (1), and may be, for example, performed in accordance with equation (3).

$$w_i = \alpha'_i \cdot w_i + (1 - \alpha'_i) \cdot \sum_{j=1}^{N} \beta'_{ij} \cdot w_j \quad (3)$$

Here, in equation (3), $\beta_{ij}$ denotes a coefficient that indicates a degree to which each weight matrix $w_j$ of the RNNPB#j (j=1, 2, ..., N) influences the weight matrix $w_i$ of the RNNPB#i.

Thus, the summation $\Sigma \beta_{ij}' w_j$ at the second term of the right-hand side in equation (3) indicates a weighted average value of the weight matrices $w_1$ to $w_N$ of the RNNPB#1 to the RNNPB#N using the coefficient $\beta_{ij}'$ as a weight, and $\alpha_i'$ is a coefficient that indicates a degree to which the weighted average value $\Sigma \beta_{ij}' w_j$ influences the weight matrix $w_i$.

The coefficients $\alpha_i'$ and $\beta_{ij}'$ may be, for example, larger than 0.0 and smaller than 1.0.

According to equation (3), as the coefficient $\alpha_i'$ increases, sharing becomes weaker (the influence of the weighted average value $\Sigma \beta_{ij}' w_j$ received by the weight matrix $w_i$ reduces), whereas, as the coefficient $\alpha_i'$ reduces, sharing becomes stronger.

Next, the learning process of the learning device shown in FIG. 1 when RNNPBs are employed as pattern learning models will be described with reference to the flowchart of FIG. 4.

In step S21, the model learning unit $12_i$ of each learning module $10_i$ initializes the weight matrix $w_i$, which has model parameters of the RNNPB#i stored in the model storage unit $13_i$, for example, by random number, or the like, and then the process proceeds to step S22.

In step S22, the learning module $10_i$ waits until learning data $x_t$ to be learned by the learning module $10_i$ are input, and then uses the learning data $x_t$ to perform update learning to update the model parameters.

That is, in step S22, in the learning module $10_i$, the pattern input unit $11_i$, where necessary, processes the learning data $x_t$ supplied to the learning module $10_i$ and then supplies the learning data $x_t$ to the model learning unit $12_i$.

Furthermore, in step S22, the model learning unit $12_i$ uses the learning data $x_t$ supplied from the pattern input unit $11_i$ to perform update learning to update the weight matrix $w_i$ of the RNNPB#i stored in the model storage unit $13_i$ by means of, for example, BPTT (Back-Propagation Through Time) method, and then updates the content stored in the model storage unit $13_i$ by the weight matrix $w_i$, which has new model parameters obtained through the update learning.

Here, the processes in steps S21 and S22 are performed in all the N learning modules $10_1$ to $10_N$.

In addition, the BPTT method is, for example, described in Japanese Unexamined Patent Application Publication No. 2002-236904, or the like.

After step S22, the process proceeds to step S23, and then the weight matrix sharing unit 21 of the model parameter sharing unit 20 performs sharing process to cause all the N learning modules $10_1$ to $10_N$ to share all the weight matrices $w_1$ to $w_N$.

That is, in step S23, the weight matrix sharing unit 21, for example, uses the weight matrices $w_1$ to $w_N$ stored respectively in the model storage units $13_1$ to $13_N$ to calculate correction components $\Delta w_1$ to $\Delta w_N$ in accordance with equation (2), and then corrects the weight matrices $w_1$ to $w_N$ stored respectively in the model storage units $13_1$ to $13_N$ using the correction components $\Delta w_1$ to $\Delta w_N$ in accordance with equation (1).

After step S23, the process proceeds to step S24, and then the learning device shown in FIG. 1 determines whether the learning termination condition is satisfied.

Here, the learning termination condition that in step S24 may be, for example, when the number of learning times, that is, the number of times steps S22 and S23 are repeated, reaches a predetermined number of times, or when an error of output data $x^*_{t+1}$ output from the RNNPB#i for input data $x_t$, that is, a predicted value $x^*_{t+1}$ of the input data $x_{t+1}$, with respect to the input data $x_{t+1}$ is smaller than or equal to a predetermined value.

In step S24, when it is determined that the learning termination condition is not satisfied, the process returns to step S22, and, thereafter, the same processes are repeated, that is, the update learning of the weight matrix $w_i$ and the sharing process are alternately repeated.

In addition, in step S24, when it is determined that the learning termination condition is satisfied, the process ends.

Figure 4:
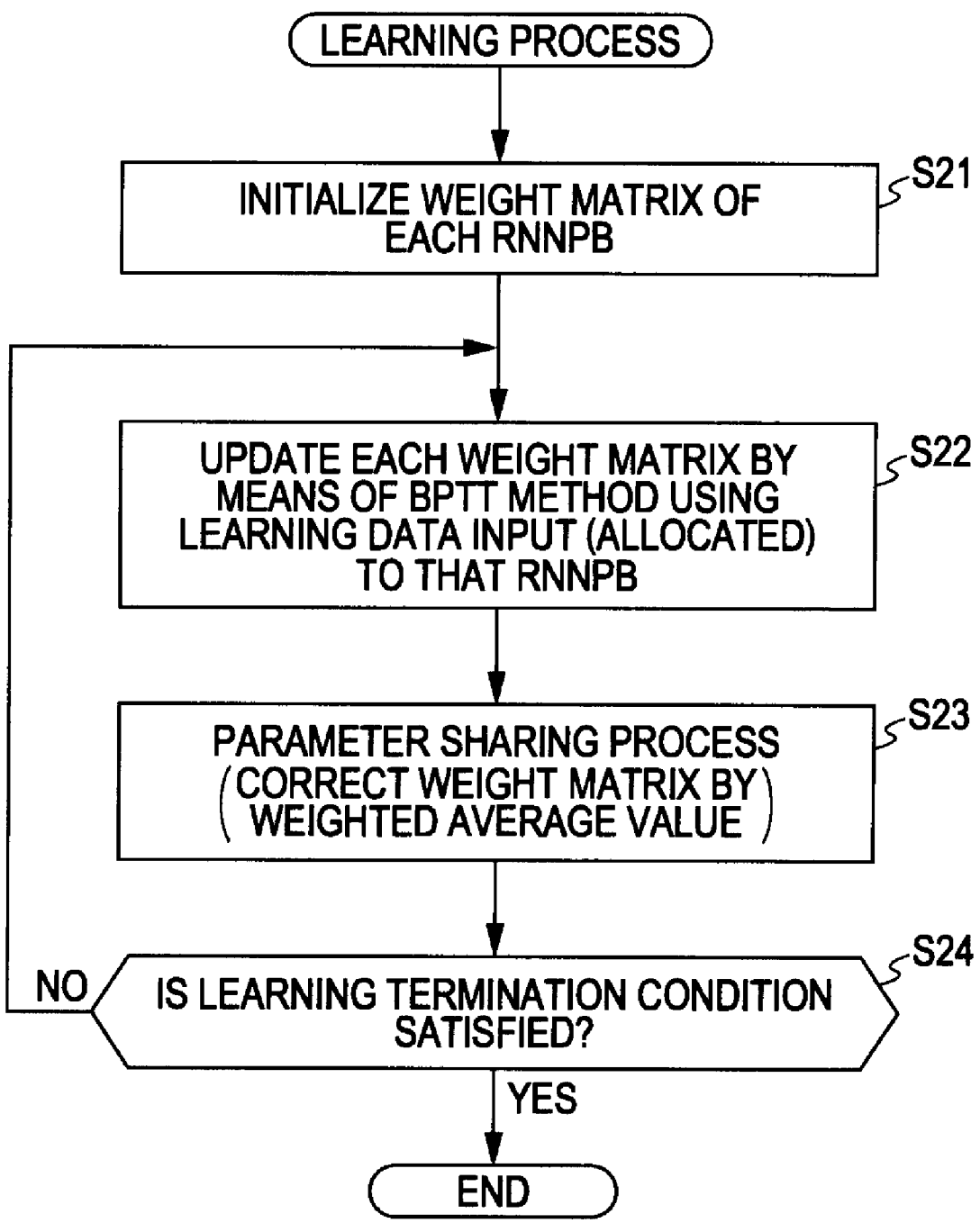
FIG. 4 is a flowchart that illustrates a learning process of the learning device shown in FIG. 1 when RNNPBs are employed as pattern learning models.

Note that, in FIG. 4 as well, the processes of step S22 and step S23 may be performed in reverse order.

As described above, in each of the plurality of learning modules $10_1$ to $10_N$ that are excellent in scalability, model parameters are shared while update learning is performed to update the model parameters of each of the plurality of learning modules $10_1$ to $10_N$. Thus, generalization capability obtained through learning in only one learning module may be obtained by all the plurality of learning modules $10_1$ to $10_N$. As a result, it is possible to obtain a pattern learning model that has scalability and generalization capability at a time.

That is, a large number of patterns may be acquired (stored), and a commonality of a plurality of patterns may be acquired. Furthermore, by acquiring a commonality of a plurality of patterns, it is possible to recognize or generate an unlearned pattern on the basis of the commonality.

Specifically, for example, when audio data of N types of phonemes are given to each of the N learning modules $10_1$ to $10_N$ as learning data, and learning of the pattern learning models is performed, the pattern learning models are able to recognize or generate audio data of a time-series pattern that is not used for learning. Furthermore, for example, when N types of driving data for driving an arm of a robot are given to each of the N learning modules $10_1$ to $10_N$ as learning data, and learning of the pattern learning models is performed, the pattern learning models are able to generate time-series pattern driving data that are not used for learning and, as a result, the robot is able to perform untaught action of the arm.

In addition, the learned pattern learning models are able to evaluate similarity among the pattern learning models on the basis of distances among model parameters (resources) of the pattern learning models, and to cluster patterns as a cluster, each of which includes pattern learning models having high similarity.

Next, the results of simulation of learning process (hereinafter, referred to as share learning process where appropriate) performed by the learning device shown in FIG. 1, conducted by the inventors, will be described with reference to FIG. 5 to FIG. 9E.

Figure 5:
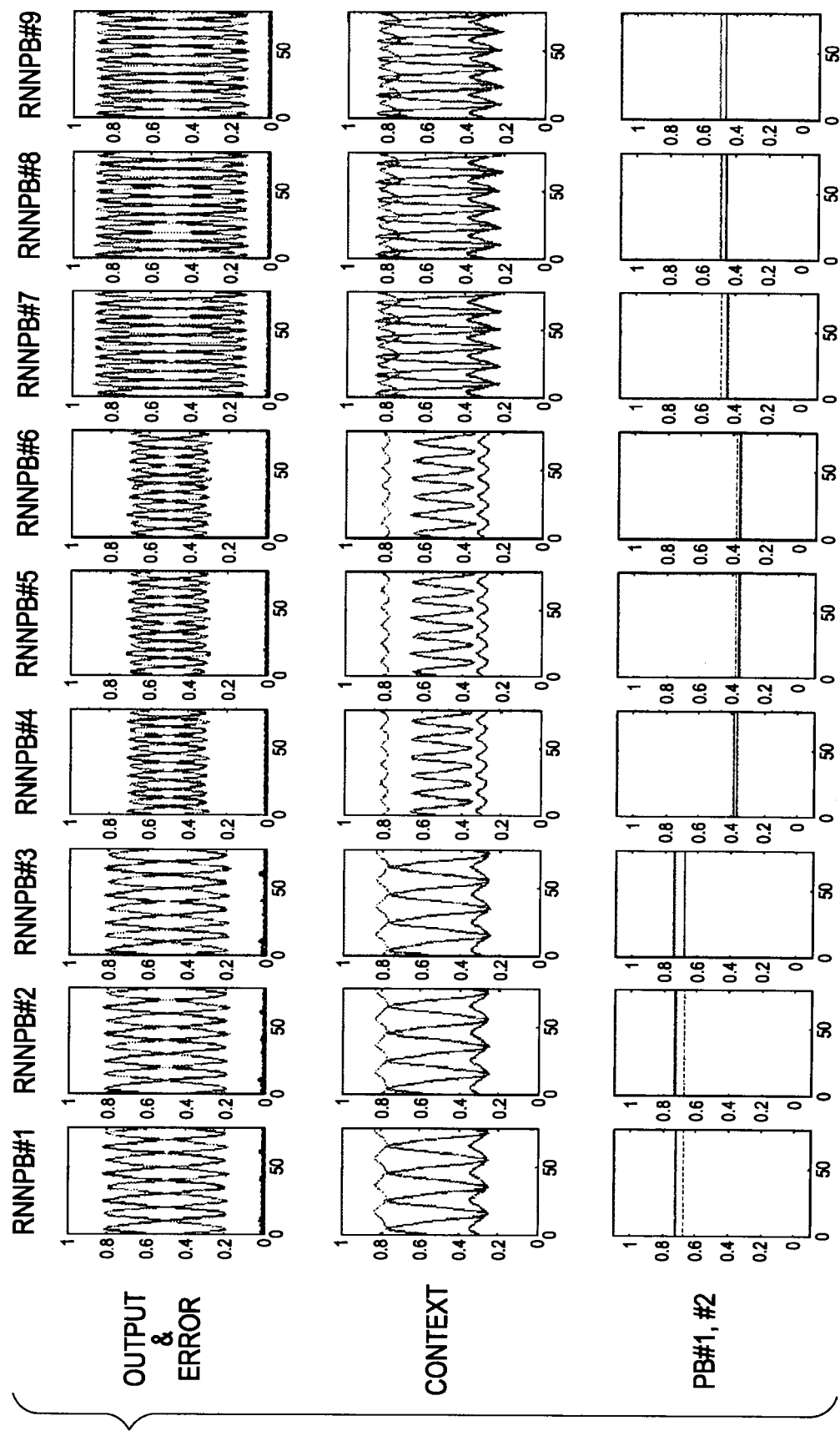
FIG. 5 is a view that shows the results of simulation.

FIG. 5 shows pieces of data about pattern learning models on which learning is performed in share learning process.

Note that, in the simulation, nine RNNPB#1 to RNNPB#9, to which two PBs are input to the input layers and three contexts are fed back to the input layers, were employed as pattern learning models, and nine pieces of time-series data that are obtained by superimposing three different noises N#1, N#2 and N#3 on time-series data of three patterns P#1, P#2 and P#3 as learning data were used.

In addition, time-series data obtained by superimposing the noise N#1 on time-series data of the pattern P#1 are given to the RNNPB#1 as learning data, time-series data obtained by superimposing the noise N#2 on time-series data of the pattern P#1 are given to the RNNPB#2 as learning data, and time-series data obtained by superimposing the noise N#3 on time-series data of the pattern P#1 are given to the RNNPB#3 as learning data.

Similarly, time-series data obtained by superimposing the noise N#1 on time-series data of the pattern P#2 are given to the RNNPB#4 as learning data, time-series data obtained by superimposing the noise N#2 on time-series data of the pattern P#2 are given to the RNNPB#5 as learning data, and time-series data obtained by superimposing the noise N#3 on time-series data of the pattern P#2 are given to the RNNPB#6 as learning data. In addition, time-series data obtained by superimposing the noise N#1 on time-series data of the pattern P#3 are given to the RNNPB#7 as learning data, time-series data obtained by superimposing the noise N#2 on time-series data of the pattern P#3 are given to the RNNPB#8 as learning data, and time-series data obtained by superimposing the noise N#3 on time-series data of the pattern P#3 are given to the RNNPB#9 as learning data.

Note that update learning was performed so as to reduce an error (prediction error) of a predicted value $x^*_{t+1}$ of input data $x_{t+1}$, which are output data output from each RNNPB for the input data $x_t$, with respect to the input data $x_{t+1}$.

The uppermost row in FIG. 5 shows output data output respectively from the RNNPB#1 to RNNPB#9 and prediction errors of the output data when learning data given at the time of learning are given to the learned RNNPB#1 to RNNPB#9 as input data.

In the uppermost row in FIG. 5, the prediction errors are almost zero, so the RNNPB#1 to the RNNPB#9 output the input data, that is, output data that substantially coincide with the learning data given at the time of learning.

The second row from above in FIG. 5 shows changes over time of three contexts when the learned RNNPB#1 to RNNPB#9 output the output data shown in the uppermost row in FIG. 5.

In addition, the third row from above in FIG. 5 show changes over time of two PB2 (hereinafter, two PB2 are respectively referred to as PB#1 and PB#2 where appropriate) when the learned RNNPB#1 to RNNPB#9 output the output data shown in the uppermost row in FIG. 5.

Figure 6:
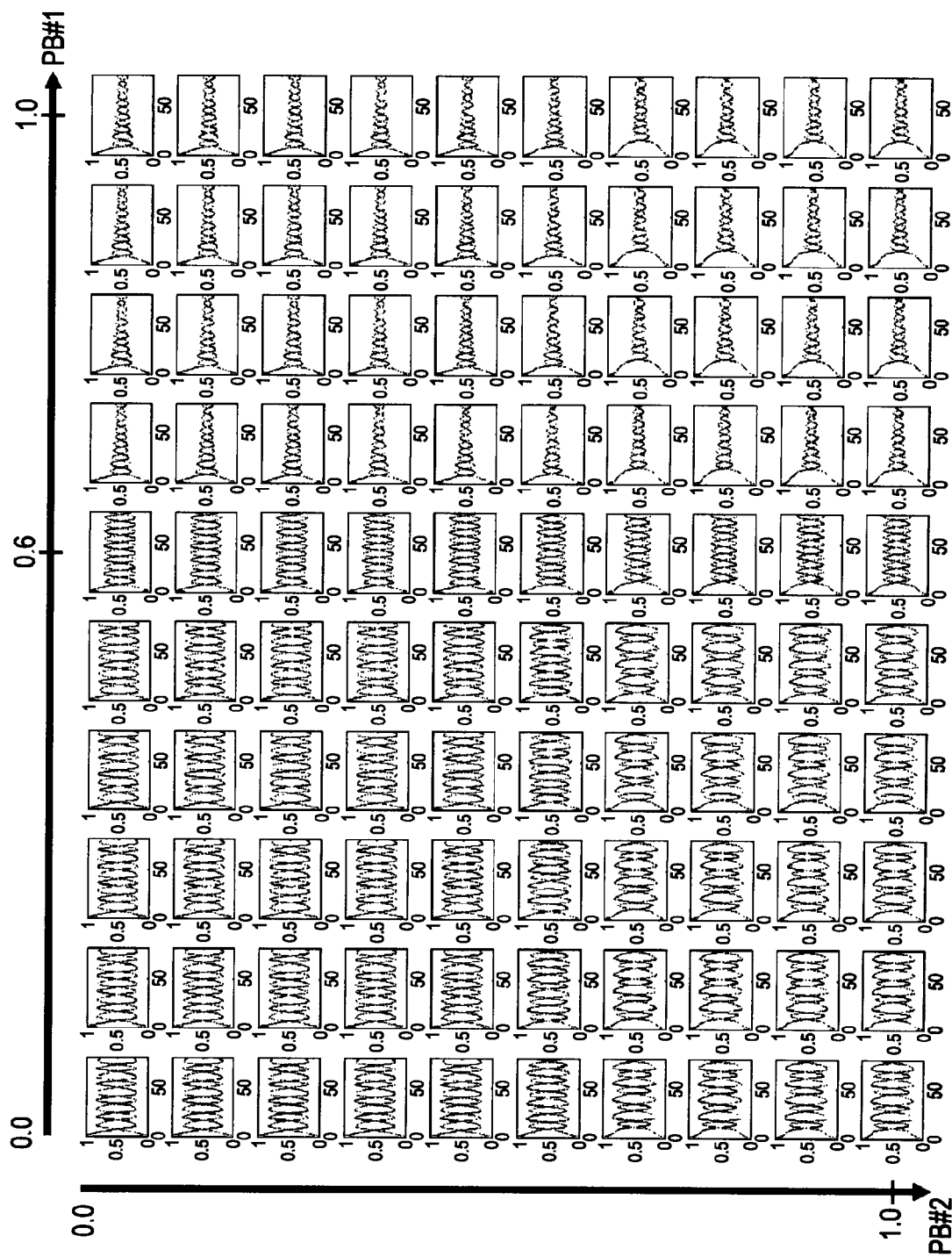
FIG. 6 is a view that shows the results of simulation.

FIG. 6 shows output data output to the PB#1 and PB#2 of each value from, for example, the fifth RNNPB#5 from among the learned RNNPB#1 to RNNPB#9.

Note that in FIG. 6, the abscissa axis represents the PB#1, and the ordinate axis represents the PB#2.

According to FIG. 6, the RNNPB#5 outputs output data that substantially coincide with learning data given at the time of learning when the PB#1 is about 0.6. Thus, it is found that the RNNPB#5 has the pattern P#2 of the learning data given at the time of learning.

In addition, the RNNPB#5 outputs time-series data that are similar to the pattern P#1 learned by the RNNPB#1 to the RNNPB#3 and the pattern P#3 learned by the RNNPB#7 to the RNNPB#9 when the PB#1 is smaller than 0.6. Thus, it is found that the RNNPB#5 receives the influence of the pattern P#1 acquired by the RNNPB#1 to the RNNPB#3 or the influence of the pattern P#3 acquired by the RNNPB#7 to the RNNPB#9, and also has an intermediate pattern that appears when the pattern P#2 of learning data given to the RNNPB#5 at the time of learning deforms toward the pattern P#1 acquired by the RNNPB#1 to the RNNPB#3 or the pattern P#3 acquired by the RNNPB#7 to the RNNPB#9.

Furthermore, the RNNPB#5 outputs time-series data of a pattern that is not learned by any of the nine RNNPB#1 to RNNPB#9 when the PB#1 is larger than 0.6. Thus, it is found that the RNNPB#5 receives the influence of the pattern P#1 acquired by the RNNPB#1 to the RNNPB#3 or the pattern P#3 acquired by the RNNPB#7 to the RNNPB#9, and also has a pattern that appears when the pattern P#2 of learning data given to the RNNPB#5 at the time of learning deforms toward a side opposite to the pattern P#1 acquired by the RNNPB#1 to the RNNPB#3 or a side opposite to the pattern P#3 acquired by the RNNPB#7 to the RNNPB#9.

Figure 7:
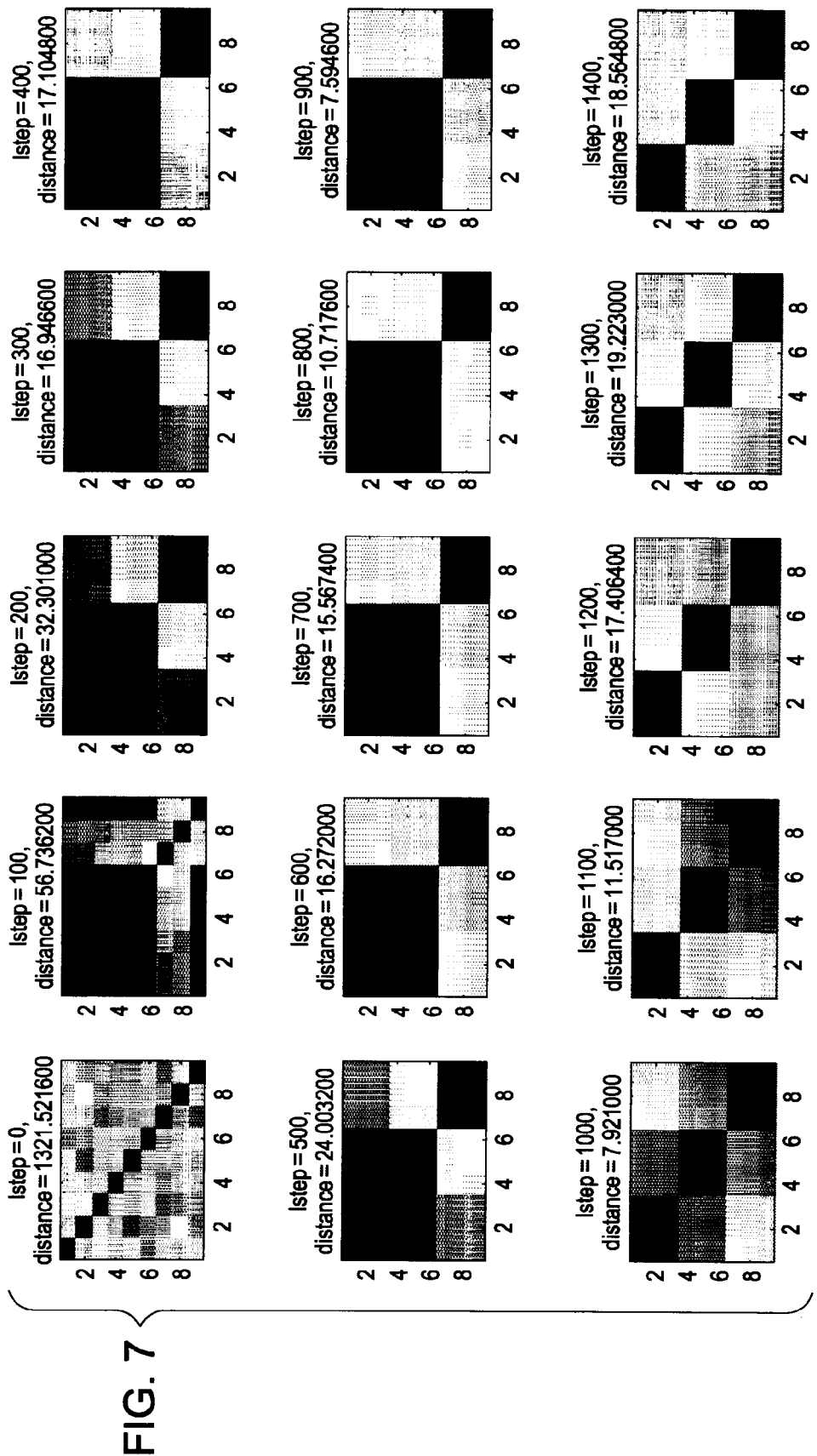
FIG. 7 is a view that shows the results of simulation.

Next, FIG. 7 shows rectangular maps that indicate distances in correlation among the weight matrices of the respective nine RNNPB#1 to RNNPB#9, that is, for example, distances among vectors that have weights constituting each of the weight matrices in a vector space.

Note that as the distance between the weight matrices reduces, the correlation between those two weight matrices becomes higher.

In the maps of FIG. 7, the abscissa axis and the ordinate axis both represent the weight matrices of the respective nine RNNPB#1 to RNNPB#9. A distance between the weight matrix in the abscissa axis and the weight matrix in the ordinate axis is indicated by light and dark. A darker (black) portion indicates that the distance is smaller (a lighter (white) portion indicates that the distance is larger).

In FIG. 7, among the horizontal five by vertical three maps, the upper left map indicates distances among weight matrices when the number of learning times is 0, that is, distances among initialized weight matrices, and, in the map, only distances between the weight matrices of the same RNNPB#i, arranged in a diagonal line, are small.

Hereinafter, FIG. 7 shows maps when learning progresses as it goes rightward and downward, and the lower right map indicates distances among weight matrices when the number of learning times is 1400.

According to FIG. 7, it is found that, as learning progresses, distances among the weight matrices of the RNNPB#1 to RNNPB#3 that have learned time-series data of the same pattern P#1, distances among the weight matrices of the RNNPB#4 to RNNPB#6 that have learned time-series data of the same pattern P#2 and distances among the weight matrices of the RNNPB#7 to RNNPB#9 that have learned time-series data of the same pattern P#3 become small.

Figure 8:
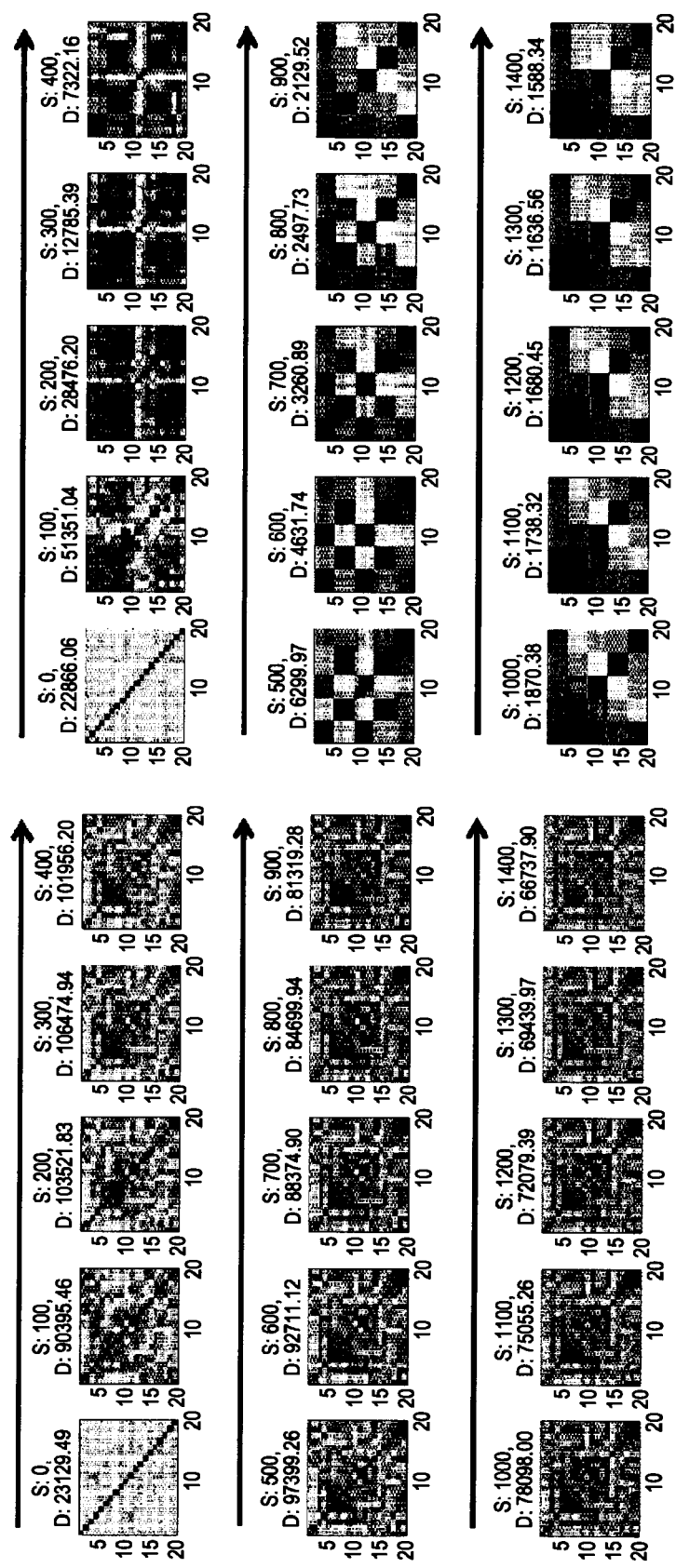
FIG. 8 is a view that shows the results of simulation.
Figure 9A:
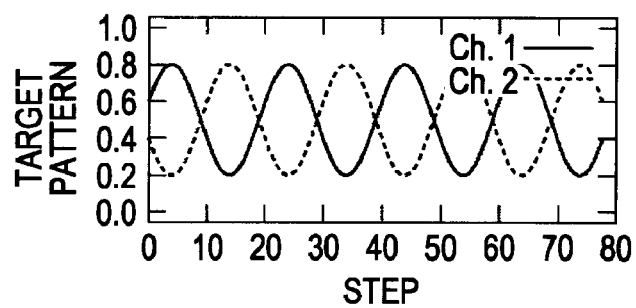
FIG. 9A to FIG. 9E are views that show time-series data used in simulation.
Figure 9B:
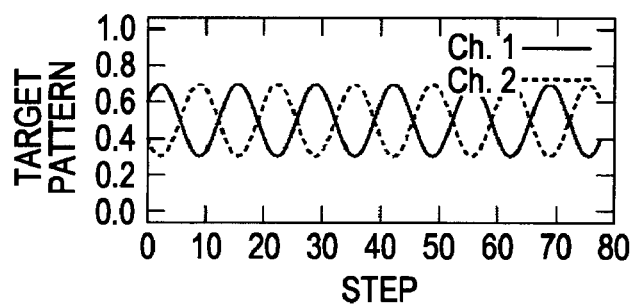
Figure 9C:
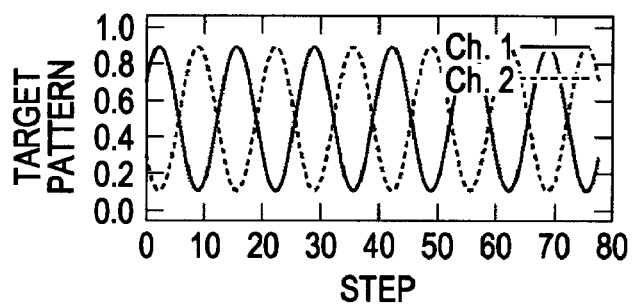
Figure 9D:
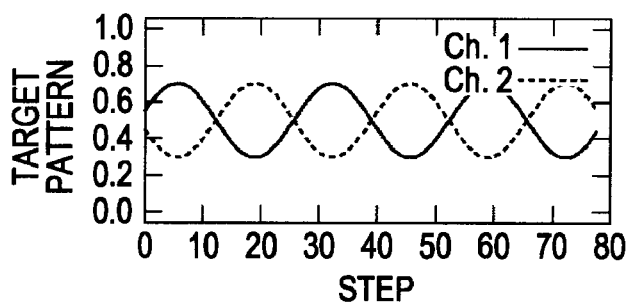
Figure 9E:
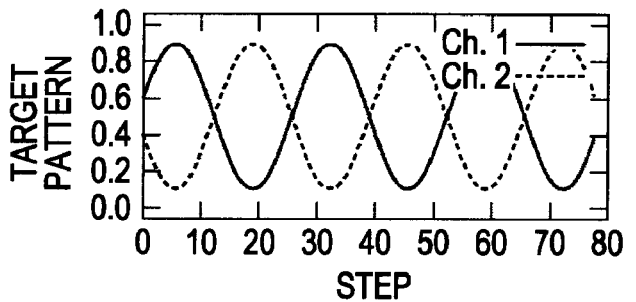

FIG. 8 shows maps similar to those of FIG. 7, indicating that distances as correlation among weight matrices of RNNPBs that have learned time-series data different from those in the case of FIG. 5 to FIG. 7.

Note that in the simulation for creating the maps of FIG. 8, twenty pieces of time-series data that are obtained by superimposing four different noises N#1, N#2, N#3 and N#4 on each of the pieces of time-series data of five types of patterns P#1, P#2, P#3, P#4 and P#5 shown in FIG. 9 were prepared, and one RNNPB was caused to learn the pieces of time-series data. Thus, the RNNPB used in simulation for creating the maps of FIG. 8 are 20 RNNPB#1 to RNNPB#20.

In addition, when learning, the time-series data of the pattern P#1 were given to the RNNPB#1 to the RNNPB#4, the time-series data of the pattern P#2 were given to the RNNPB#5 to the RNNPB#8, the time-series data of the pattern P#3 were given to the RNNPB#9 to the RNNPB#12, the time-series data of the pattern P#4 were given to the RNNPB#13 to the RNNPB#16, the time-series data of the pattern P#5 were given to the RNNPB#17 to the RNNPB#20.

5×3 maps at the left side in FIG. 8 show maps when sharing is weak, that is, a degree to which all 20 weight matrices $w_1$ to $w_{20}$ influence each of the weight matrices $w_1$ to $w_{20}$ of the 20 RNNPB#1 to RNNPB#20 is small, specifically, when the coefficient $\alpha_i$ of equation (2) is small (when $\alpha_i$ is substantially 0).

In addition, 5×3 maps at the right side in FIG. 8 show maps when sharing is strong, that is, when a degree to which all 20 weight matrices $w_1$ to $w_{20}$ influence each of the weight matrices $w_1$ to $w_{20}$ of the 20 RNNPB#1 to RNNPB#20 is large, specifically, when the coefficient $\alpha_i$ of equation (1) is not small.

Both when sharing is weak and when sharing is strong, only distances between the weight matrices of the same RNNPB#i, arranged in a diagonal line, are small in the upper left map when the number of learning times is zero.

Then, it is found that, when sharing is weak, as shown at the left side in FIG. 8, even when learning progresses, no particular tendency appears in the distances among the weight matrices, whereas, when sharing is strong, as shown at the right side in FIG. 8, distances among the weight matrices are small among RNNPBs that have learned the time-series data of the same patterns.

Thus, it is found that, through the sharing process, distributed representation is formed over a plurality of learning modules, and a plurality of RNNPBs have generalization capability.

Note that a method for update learning of model parameters by the model learning unit $12_i$ and a method for sharing process by the model parameter sharing unit 20 are not limited to the above described methods.

In addition, in the present embodiment, in the sharing process by the model parameter sharing unit 20, all the N learning modules $10_1$ to $10_N$ share the weight matrices as the model parameters; instead, for example, only a portion of the N learning modules $10_1$ to $10_N$ may share the weight matrices as the model parameters.

Furthermore, in the present embodiment, in the sharing process by the model parameter sharing unit 20, the learning modules $10_i$ share all the plurality of weights, as the plurality of model parameters, that constitute each weight matrix; instead, in the sharing process, no all the plurality of weights that constitute each weight matrix but only a portion of the weights among the plurality of weights that constitute each weight matrix may be shared.

In addition, only a portion of the N learning modules $10_1$ to $10_N$ may share only a portion of weights among a plurality of weights that constitute each weight matrix.

Note that, in the learning device shown in FIG. 1, the model parameter sharing unit 20 causes the plurality of learning modules $10_1$ to $10_N$ to share the model parameters. That is, in terms of influencing the weight matrices $w_1$ to $w_N$ of the RNNPB#1 to RNNPB#N in the respective learning modules $10_1$ to $10_N$ on the weight matrix $w_i$, which has model parameters of the RNNPB#i as a pattern learning model in each learning module $10_i$, the learning device shown in FIG. 1 is similar to the technique described in Japanese Unexamined Patent Application Publication No. 2002-024795, in which, at the time of learning of RNNs, contexts of two RNNs are changed on the basis of an error between the contexts of two RNNs, that is, the contexts of two RNNs influence the context of each RNN.

However, in the learning device shown in FIG. 1, the weight matrix, which has model parameters, is influenced, which differs from the technique described in Japanese Unexamined Patent Application Publication No. 2002-024795 in which not model parameters but contexts, which are internal states, are influenced.

That is, when a pattern learning model expressed by a function is taken for example, the model parameters of the pattern learning model are constants (when an input u, an output y, an internal state x, and equations of states that model systems respectively expressed by y=Cx+Du and x'=Ax+Bu (x' denotes the derivative of x) are taken for example, A, B, C and D correspond to constants) that are obtained through learning and that define the function expressing the pattern learning model, and the constants differ from internal states (internal states x in the example of equations of states) that are not originally constant.

Similarly, in terms of that the weight matrices $w_1$ to $w_N$ of the RNNPB#1 to RNNPB#N in the respective learning modules $10_1$ to $10_N$ influence the weight matrix $w_i$, which has model parameters of the RNNPB#i as a pattern learning model in each learning module $10_i$, the learning device shown in FIG. 1 is similar to the technique described in Yuuya Sugita, Jun Tani, "Learning Semantic Combinatoriality from the Interaction between Linguistic and Behavioral Processes", Adaptive Behavior, Vol. 13, No. 1, 33-52 (2005), which changes each of respective PBs of two RNNPBs, that is, respective PBs of the two RNNPBs influence each of the respective PBs of the RNNPBs, on the basis of a difference between the respective PBs of the two RNNPBs at the time of learning of RNNPBs.

However, the learning device shown in FIG. 1 in which the weight matrix, which has model parameters, is influenced differs from the technique described in Yuuya Sugita, Jun Tani, "Learning Semantic Combinatoriality from the Interaction between Linguistic and Behavioral Processes", Adaptive Behavior, Vol. 13, No. 1, 33-52 (2005), in which not the model parameters but PBs, which are internal states (or correspond to internal states) are influenced.

That is, as described above, the model parameters of the pattern learning model are constants that are obtained through learning and that define the function expressing the pattern learning model, and differ from the internal states, which are not constants.

Then, the model parameters are constants that are obtained through learning and that define the function expressing the pattern learning model. Therefore, at the time of learning, the model parameters are updated (changed) so as to become values corresponding to a pattern to be learned; however, the model parameters are not changed when output data are generated (when input data are input to the input layer of an RNNPB, which is a pattern learning model, and output data corresponding to the input data are output from the output layer of the RNNPB).

On the other hand, the contexts on which technique described in Japanese Unexamined Patent Application Publication No. 2002-024795 focus and the PBs on which the technique described in Yuuya Sugita, Jun Tani, "Learning Semantic Combinatoriality from the Interaction between Linguistic and Behavioral Processes", Adaptive Behavior, Vol. 13, No. 1, 33-52 (2005) focus are internal states, which differ from the model parameters, so they are changed, of course, both at the time of learning and when output data are generated.

As described above, the learning device shown in FIG. 1 differs from any of the technique described in Japanese Unexamined Patent Application Publication No. 2002-024795 and the technique described in Yuuya Sugita, Jun Tani, "Learning Semantic Combinatoriality from the Interaction between Linguistic and Behavioral Processes", Adaptive Behavior, Vol. 13, No. 1, 33-52 (2005). As a result, it is possible to obtain a pattern learning model having scalability and generalization capability at a time.

Figure 10:
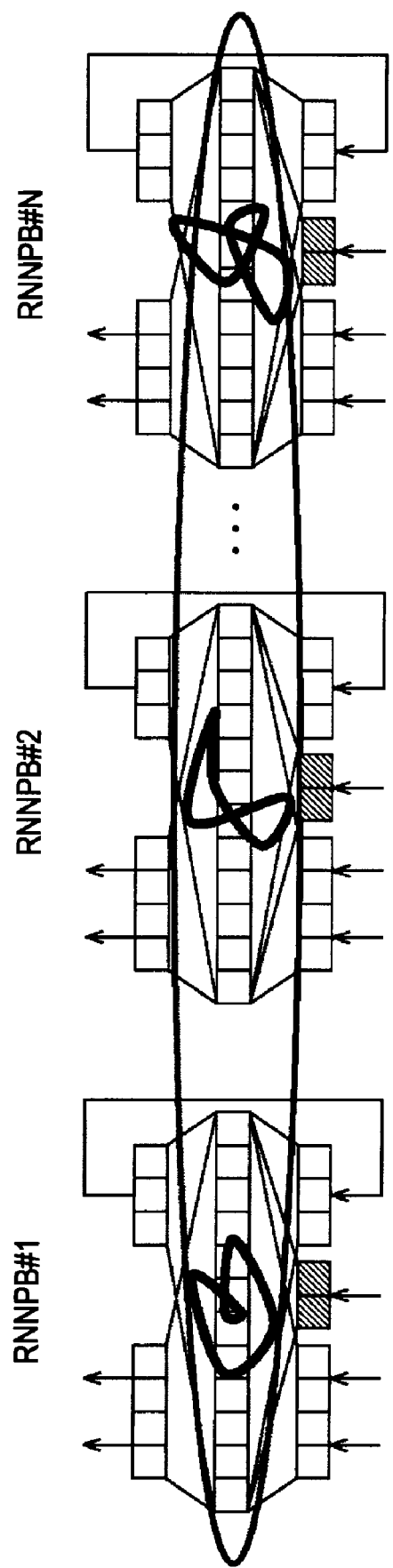
FIG. 10 is a view that schematically shows that model parameters of each RNNPB are shared.

That is, in the learning device shown in FIG. 1, for example, as shown in FIG. 10, respective model parameters of the pattern learning models, such as RNNPBs, are shared.

Figure 11:
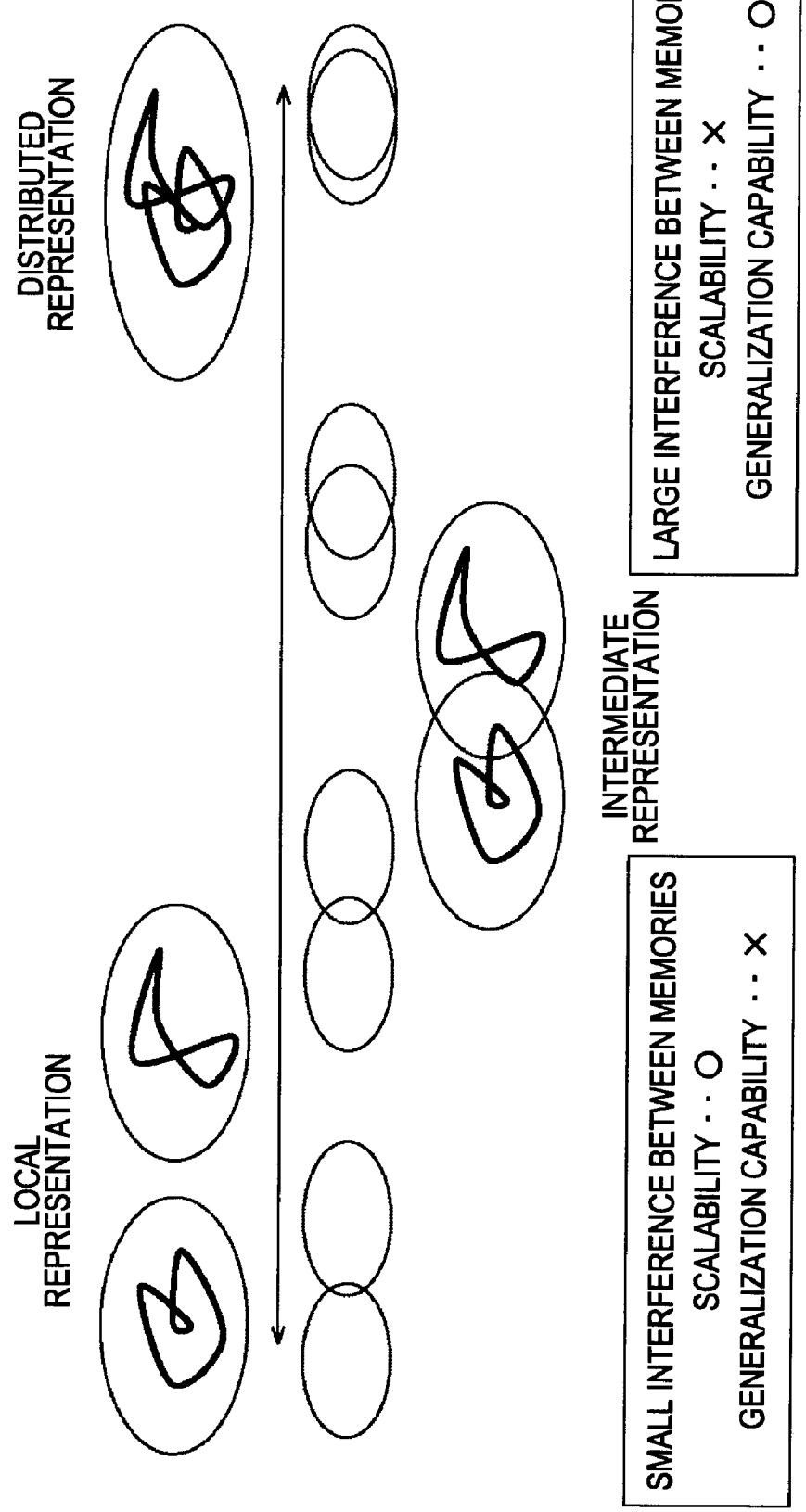
FIG. 11 is a view that schematically shows the relationship among a "local representation" scheme, a "distributed representation" scheme and an "intermediate representation" scheme.

As a result, according to the learning device shown in FIG. 1, as shown in FIG. 11, so to speak, learning of an "intermediate representation" scheme, which has the advantages of both the "local representation" scheme that is excellent in scalability but lacks in generalization capability and the "distributed representation" scheme that has generalization capability but lacks in scalability, is performed. Thus, it is possible to obtain a pattern learning model having both scalability and generalization capability at a time.

Next, a learning device that is modified from the basic learning device shown in FIG. 1 to be able to appropriately classify the learning modules $10_i$ (time-series patterns or dynamics stored by the learning modules $10_i$) subjected to the update learning on the basis of the characteristic of a time-series pattern or dynamics will be described.

The existing technique for classifying time-series patterns may be, for example, a Mixture of RNN Expert, an RNN-SOM (self-organization map), an HMM-SOM, or the like, as the one related to unsupervised classification. The RNN-SOM or the HMM-SOM employs an RNN or an HMM for each node of a self-organization map used for category learning of a vector pattern.

However, in a Mixture of RNN Expert, an RNN-SOM, an HMM-SOM, or the like, an input time-series pattern is classified on the basis of a Euclidean distance between a time-series pattern input as a learning target and a time-series pattern output from a learning module, so there is a problem that it is difficult to perform classification that appropriately reflects the characteristic of a time-series pattern or dynamics.

Figure 12:
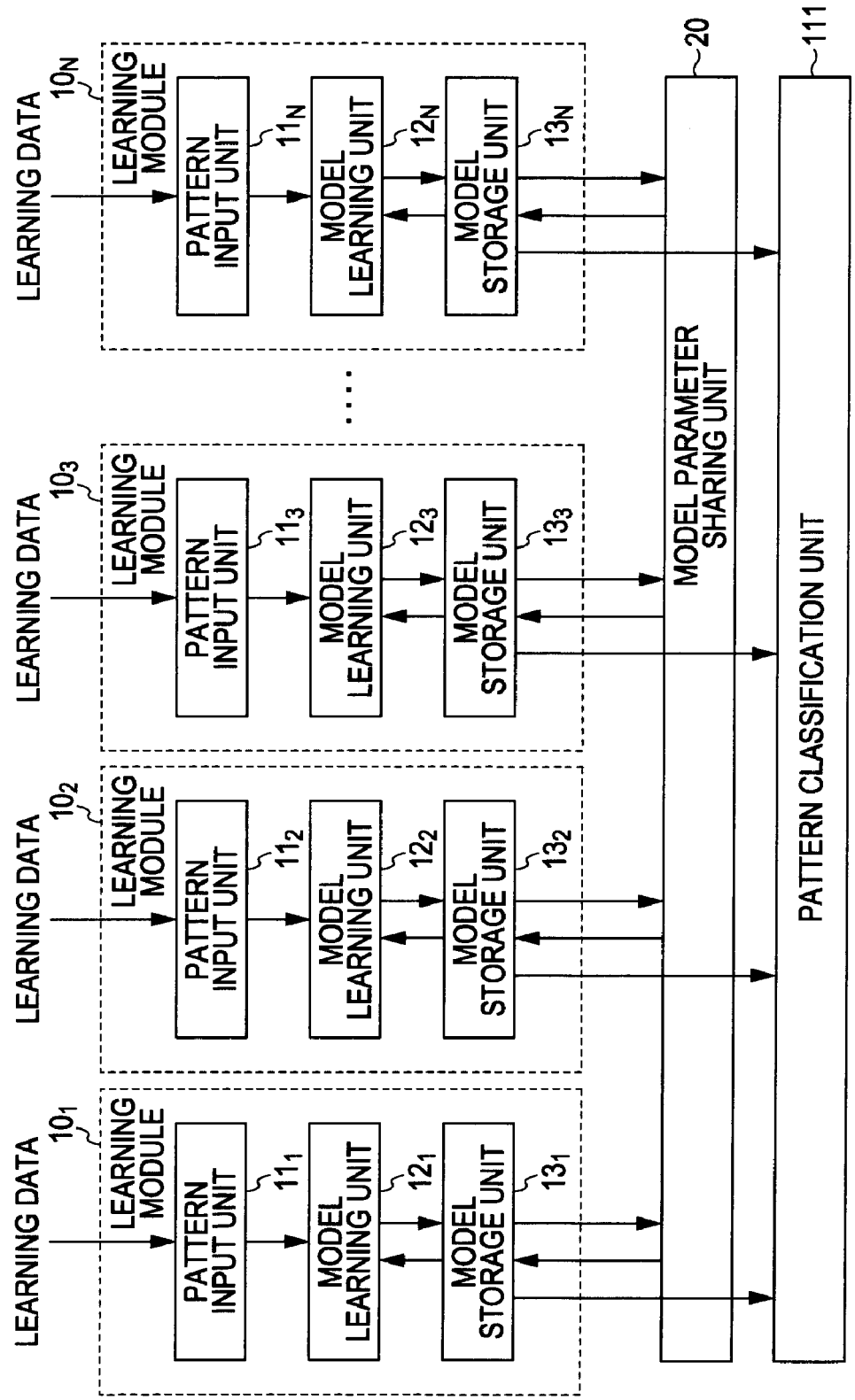
FIG. 12 is a block diagram that shows a configuration example of one embodiment of a learning device to which an embodiment of the invention is applied.

Then, FIG. 12 shows the learning device that is able to perform classification that reflects the characteristic of a time-series pattern or dynamics in such a manner that the learning device shown in FIG. 1 is developed and classification is performed on the basis of model parameter distances of pattern learning models.

That is, FIG. 12 shows a configuration example of one embodiment of the learning device to which an embodiment of the invention is applied.

In FIG. 12, like reference numerals denote components corresponding to those of the learning device shown in FIG. 1, and the description thereof is omitted.

The learning device 101 shown in FIG. 12 is formed of learning modules $10_1$ to $10_N$, a model parameter sharing unit 20 and a pattern classification unit 111, and differs from the learning device shown in FIG. 1 in that the pattern classification unit 111 is additionally provided.

The pattern classification unit 111 acquires the model parameters of each of the pattern learning models after update learning from a corresponding one of the N learning modules $10_1$ to $10_N$, and then performs classification on the basis of the model parameter distances. As described above, each pattern learning model has a plurality of model parameters that forms a vector, so a classification method based on the model parameter distances may, for example, employ a k-means method, which is one of unsupervised classification algorithms.

In addition, model parameter distances among the learning modules (hereinafter, simply referred to as parameter distances) may be obtained from Euclidean distances of the model parameters among the learning modules. For example, a parameter distance $D_{parameter}(1,2)$ between the learning module $10_1$ and the learning module $10_2$ may be calculated using equation (4). Note that k in equation (4) is a variable for identifying the model parameters of the learning modules $10_1$ and $10_2$, and, for example, $p_{1,k}$ indicates a kth ($k \leq Q$) model parameter of the learning module $10_1$.

$$D_{parameter}(1, 2) = \sqrt{\sum_{k=1}^{Q} (p_{1,k} - p_{2,k})^2} \quad (4)$$

If a pattern learning model has a low redundancy such that model parameters of a pattern learning model for a time-series pattern are uniquely determined, it is possible to easily imagine that a parameter distance is used to evaluate the similarities of pattern learning models. However, for example, in a highly redundant pattern learning model, such as a neural net (RNN), it has a characteristic such that parameter distances reduce among learning modules that learn similar time-series patterns owing to the above described sharing learning process to allow a parameter distance to be used for evaluation of similarities of pattern learning models.

The learning process, including pattern classification, performed by the learning device 101 shown in FIG. 12 will be described with reference to the flowchart of FIG. 13.

Figure 2:
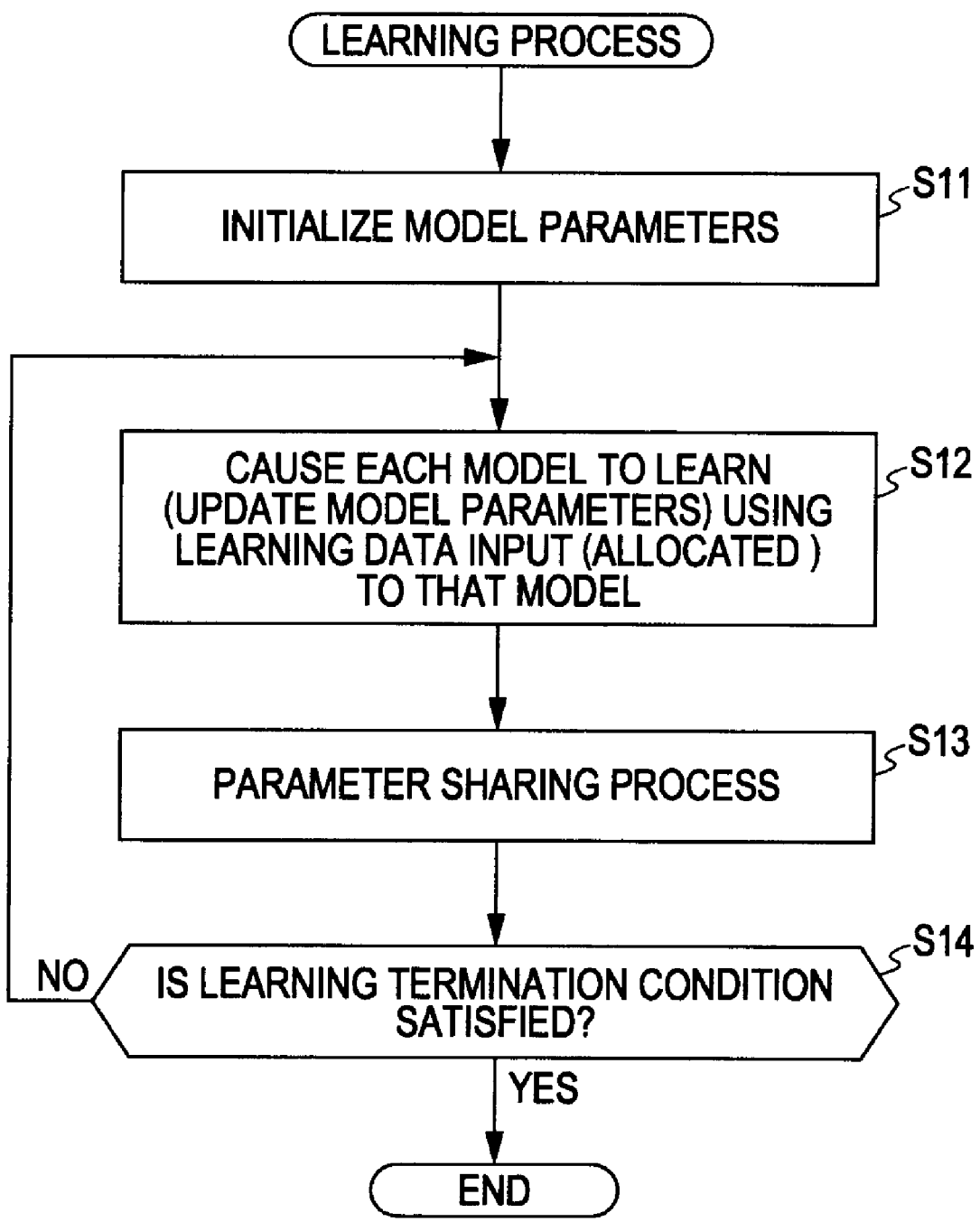
FIG. 2 is a flowchart that illustrates a learning process of the learning device shown in FIG. 1.
Figure 13:
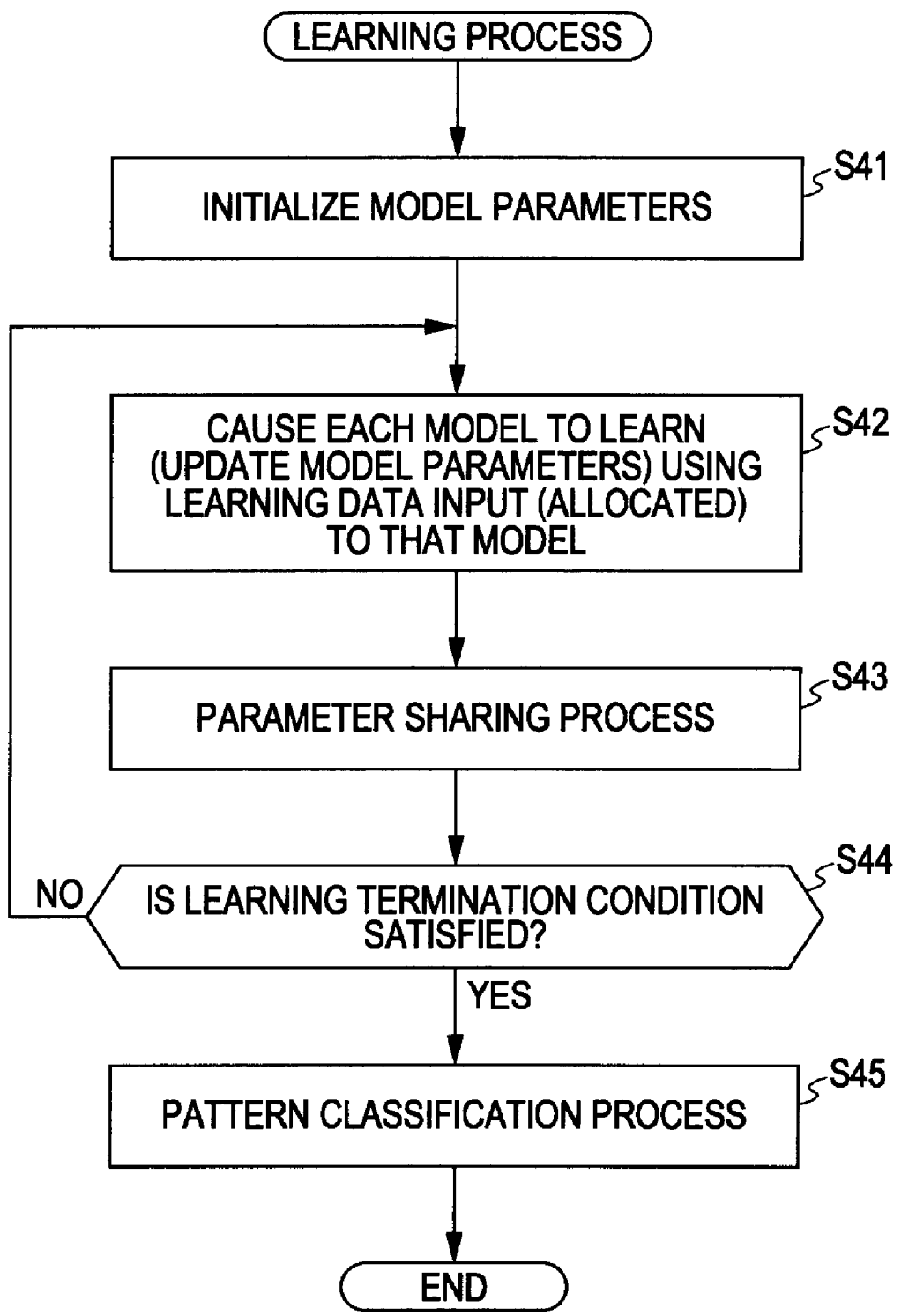
FIG. 13 is a flowchart that illustrates a learning process of the learning device shown in FIG. 12.

In the learning process shown in FIG. 13, steps S41 to S44 respectively correspond to steps S11 to S14 in FIG. 2, and the learning process shown in FIG. 13 differs from the learning process shown in FIG. 2 only in that step S45 is inserted after step S44. Therefore, only the process in step S45 of FIG. 13 will be described.

In step S44, when it is determined that the learning termination condition is satisfied, the process proceeds to step S45. Then, the pattern classification unit 111 acquires the learned model parameters from the N learning modules $10_1$ to $10_N$, and uses a k-means method, which is an unsupervised classification algorithm, to perform pattern classification process. After the process in step S45 is completed, the learning process ends.

Next, the case where RNNs are employed as pattern learning models will be described. RNNs differ from RNNPBs in that the input layer has no PB units, and update learning, and the like, other than that, may be performed as well as RNNPBs.

Figure 14:
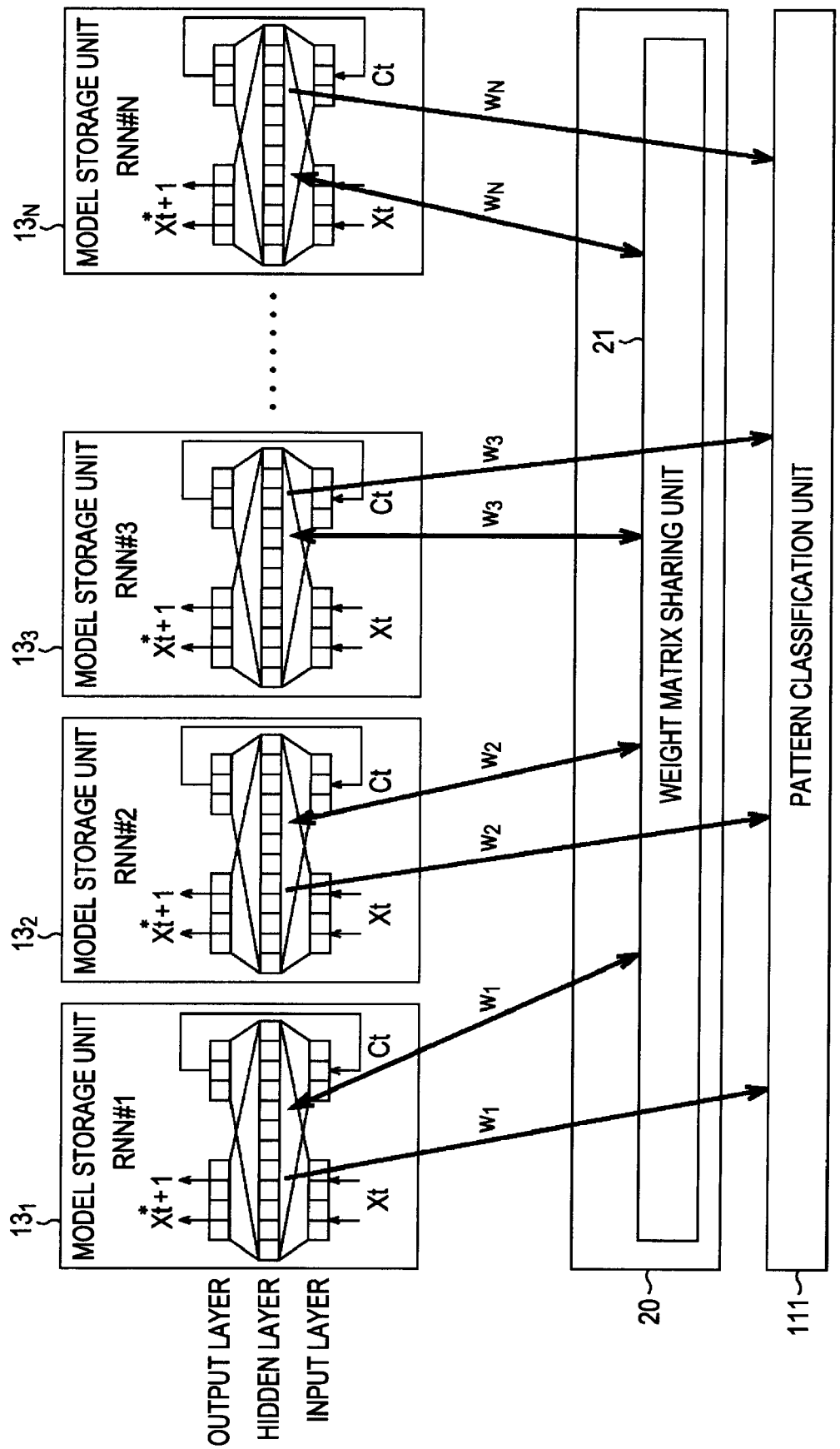
FIG. 14 is a block diagram that shows a configuration example of the learning device shown in FIG. 12 when RNNPBs are employed as pattern learning models.

FIG. 14 shows a configuration example of the learning device 101 shown in FIG. 12 when RNNs are employed as pattern learning models.

In the RNN, a weight corresponds to a model parameter, so the pattern classification unit 111 acquires the weight matrices $w_1$ to $w_N$ of the respective RNN#1 to RNN#N after update learning from the learning modules $10_1$ to $10_N$, and then performs classification based on Euclidean distances between the weight matrices (hereinafter, referred to as weight distances).

For example, when weights of the weight matrix $w_1$ of the RNN#1 are respectively $w_{1,k,l}$ ($1 \leq k \leq Q$, $1 \leq l \leq R$), and weights of the weight matrix $w_2$ of the RNN#2 are respectively $w_{2,k,l}$, a weight distance $D_{weight}(1,2)$ between the RNN#1 and the RNN#2 may be expressed by equation (5).

$$D_{weight}(1, 2) = \sqrt{\sum_{k=1}^{Q} \sum_{l=1}^{R} (w_{1,k,l} - w_{2,k,l})^2} \quad (5)$$

Figure 15:
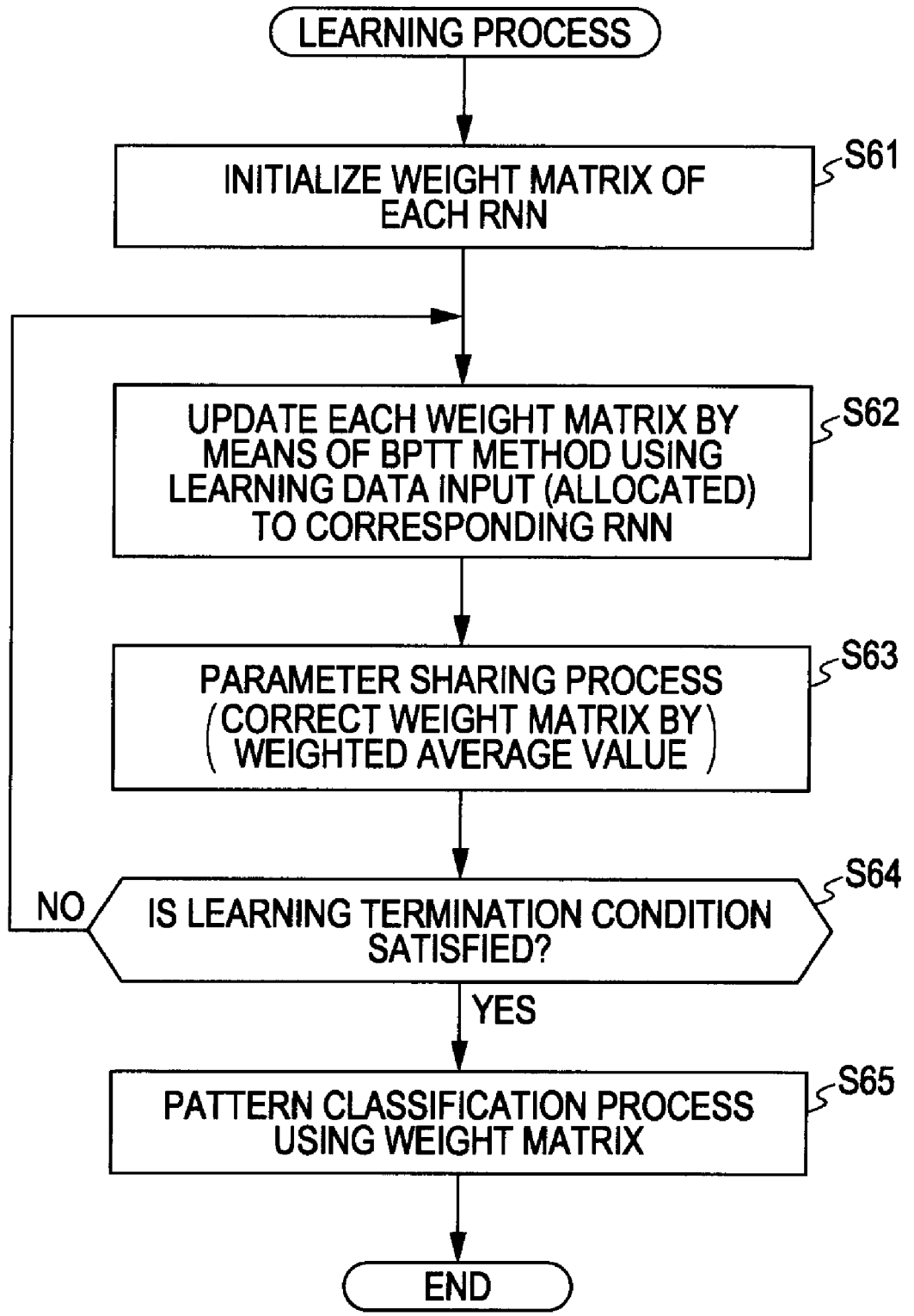
FIG. 15 is a flowchart that illustrates a learning process of the learning device shown in FIG. 12 when RNNs are employed as pattern learning models.

FIG. 15 is a flowchart that illustrates a learning process of the learning device 101 shown in FIG. 12 when RNNs are employed as pattern learning models.

In the learning process shown in FIG. 15, steps S61 to S64 respectively correspond to steps S21 to S24 in FIG. 4, and the learning process shown in FIG. 15 differs from the learning process shown in FIG. 4 only in that step S65 is inserted after step S64. Therefore, only the process in step S65 of FIG. 15 will be described.

In step S64, when it is determined that the learning termination condition is satisfied, the process proceeds to step S65. Then, the pattern classification unit 111 acquires the learned weight matrices $w_1$ to $w_N$ from the N learning modules $10_1$ to $10_N$, and uses the acquired weight matrices $w_1$ to $w_N$ to perform pattern classification using a k-means method. After the process in step S65 is completed, the learning process ends.

As described above, the learning device 101 is able to classify learning modules on the basis of the characteristic of a time-series pattern or dynamics using the learned weight matrices $w_1$ to $w_N$. Thus, for example, it is possible to, for example, extract (so-called perform data mining) a characteristic common to a large number of learning modules.

Next, the results of an experiment that examines the pattern classification process performed by the learning device 101 shown in FIG. 12 will be described with reference to FIG. 16 to FIG. 19.

Figure 16:
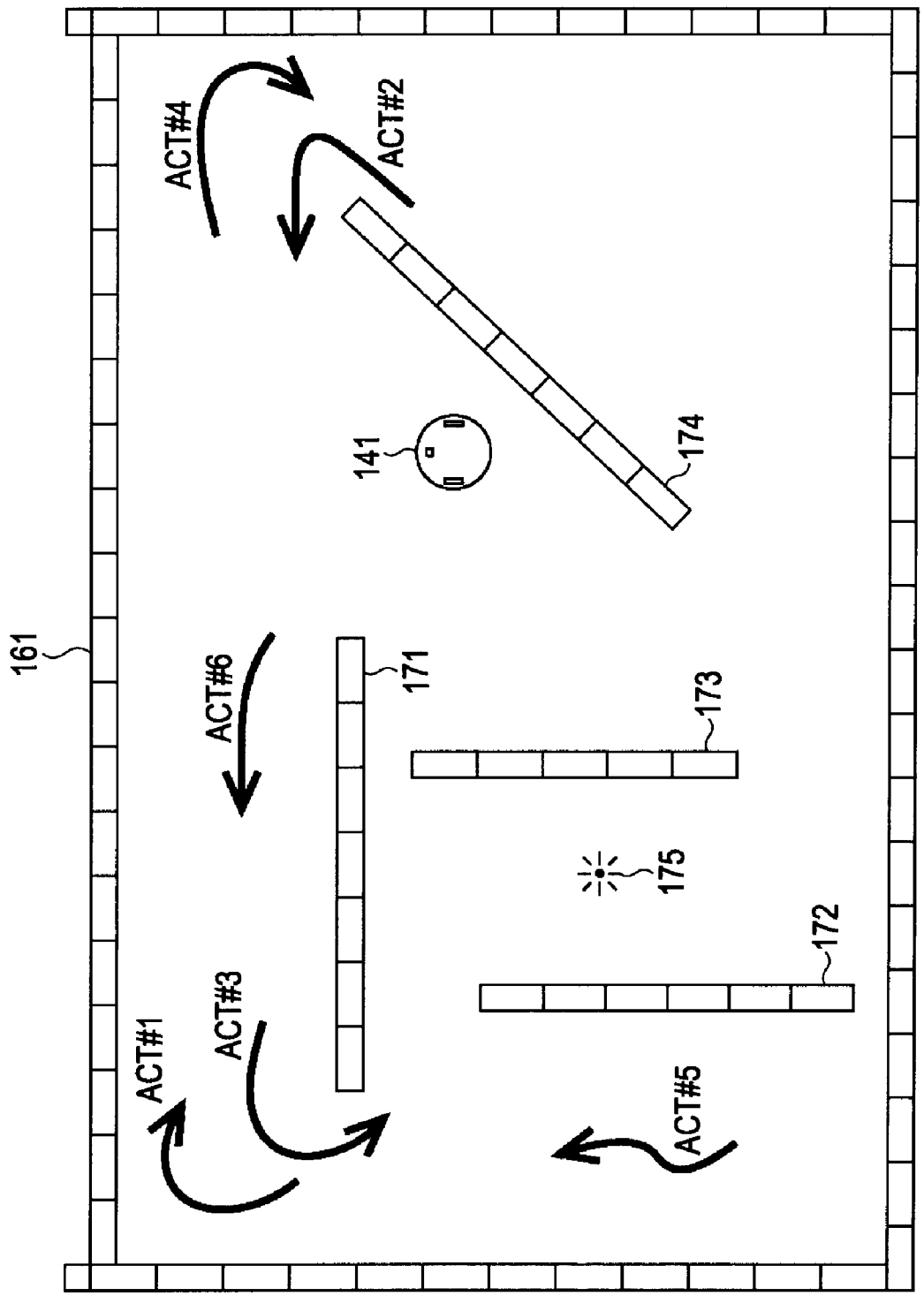
FIG. 16 is a view that illustrates an environment under which an experiment to examine pattern classification process was conducted.

FIG. 16 shows an environment under which the experiment was conducted.

The inventors conducted the experiment that a mobile robot 141 equipped with the learning device 101 shown in FIG. 12 is caused to learn movement on the two-dimensional plane as an action pattern. Note that the RNN in which three contexts are fed back to the input layer was employed as the pattern learning model.

Specifically, the inventors placed the mobile robot 141 in a space (room) 161 surrounded by four side walls, as shown in FIG. 16, and caused each RNN of the mobile robot 141 to learn six action patterns ACT#1 to ACT#6 for moving in the space 161. Note that barriers 171 to 174 and a light 175 are provided in the space 161. In addition, in addition to the six action patterns ACT#1 to ACT#6, reflex actions, such as avoiding a wall (barrier) and approaching the light, are input to (learned by) the mobile robot 141 in advance.

Figure 17:
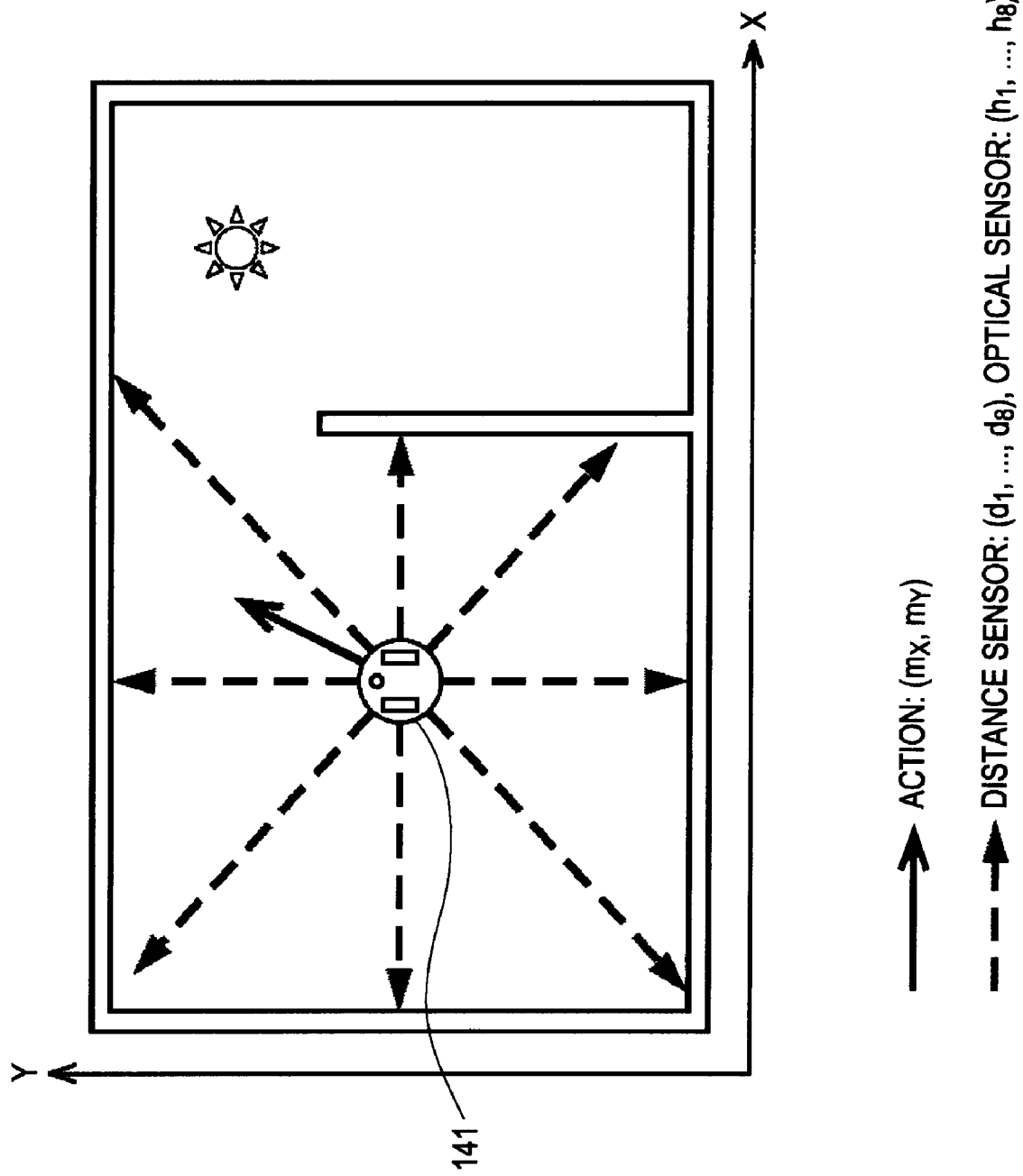
FIG. 17 is a view that illustrates a mobile robot used in the experiment that examines the pattern classification process.

The mobile robot 141 includes a distance sensor and an optical sensor. More specifically, as shown in FIG. 17, the mobile robot 141 includes a distance sensor and optical sensor that detect a distance or light in eight detecting directions (directions indicated by the dotted lines), which are obtained by equally dividing 360 degrees around the mobile robot 141 on a predetermined plane parallel to a two-dimensional plane (XY-plane). Input values of the distance sensor in the eight directions are $d_1$ to $d_8$, and input values of the optical sensor in the eight directions are $h_1$ to $h_8$.

Then, to cause the mobile robot 141 to learn action patterns means not to cause the mobile robot 141 to learn a trajectory on the two-dimensional plane (locus of a position) but to cause the mobile robot 141 to learn sensor input values acquired by the sensors and time-series data of an output value of a driving unit of the mobile robot 141 when the mobile robot 141 passes each trajectory.

Thus, in the experiment, the mobile robot 141 learned an 18-dimensional ($m_x, m_y, d_1, \ldots, d_8, h_1, \ldots, h_8$) vector pattern (time-series data) formed of the input values $d_1$ to $d_8$ of the distance sensor, the input values $h_1$ to $h_8$ of the optical sensor and a movement vector ($m_x, m_y$) corresponding to a predetermined motor output.

Note that the inventors caused the mobile robot 141 to learn five variations, each of which is slightly different in trajectory, for each of the six action patterns ACT#1 to ACT#6, so the number of samples of the learned action patterns is 30 (six action patterns×five variations) in total.

Figure 18:
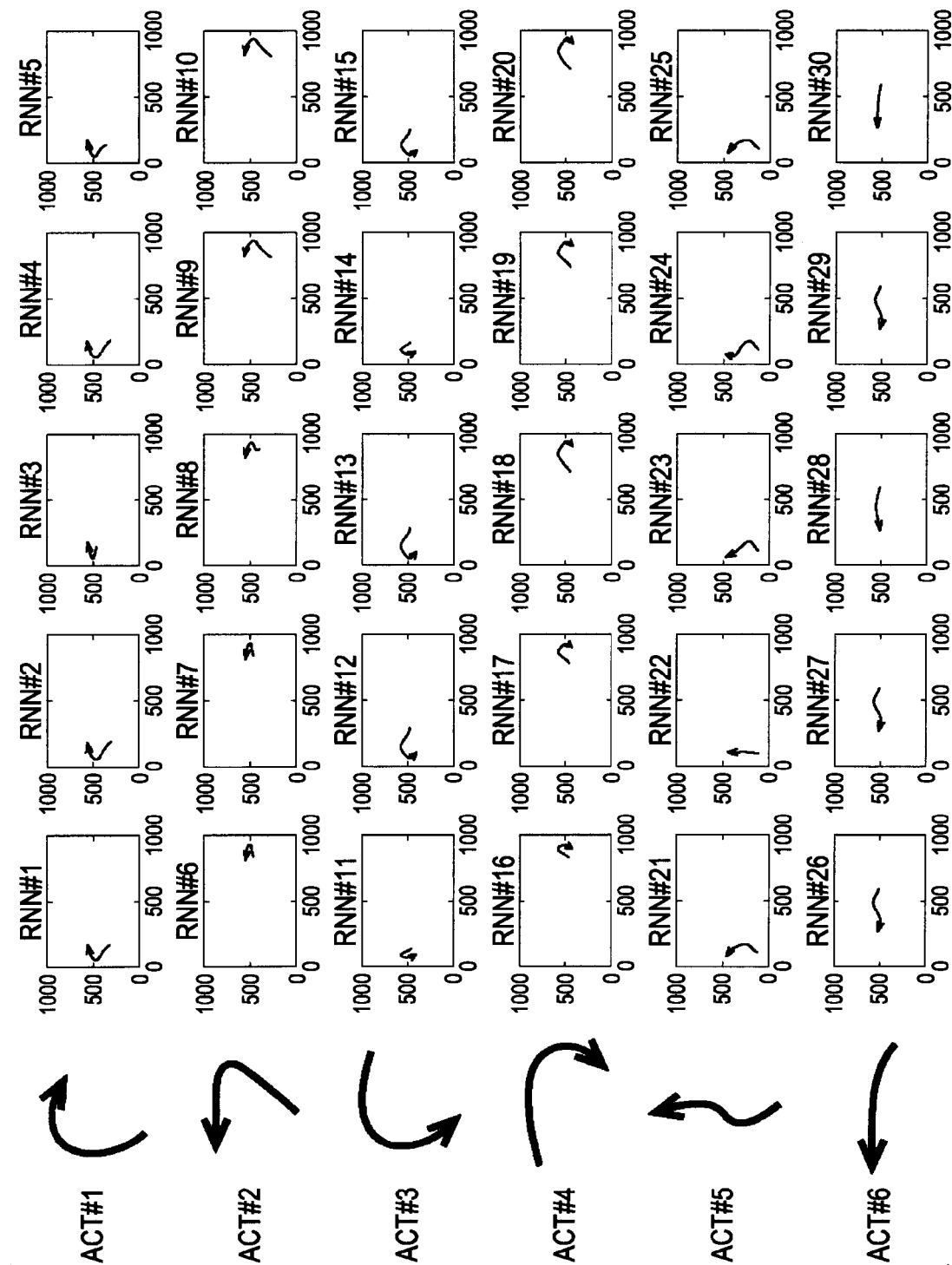
FIG. 18 is a view that shows action patterns used for causing the learning device shown in FIG. 12 to learn.

FIG. 18 shows the action patterns ACT#1 to ACT#6 about which 30 RNN#1 to RNN#30 are caused to learn.

As shown in FIG. 18, the inventors caused the RNN#1 to the RNN#5 to learn five variations of the action pattern ACT#1, caused the RNN#6 to the RNN#10 to learn five variations of the action pattern ACT#2, caused the RNN#11 to the RNN#15 to learn five variations of the action pattern ACT#3, caused the RNN#16 to the RNN#20 to learn five variations of the action pattern ACT#4, caused the RNN#21 to the RNN#25 to learn five variations of the action pattern ACT#5, and caused the RNN#26 to the RNN#30 to learn five variations of the action pattern ACT#6.

Figure 19:
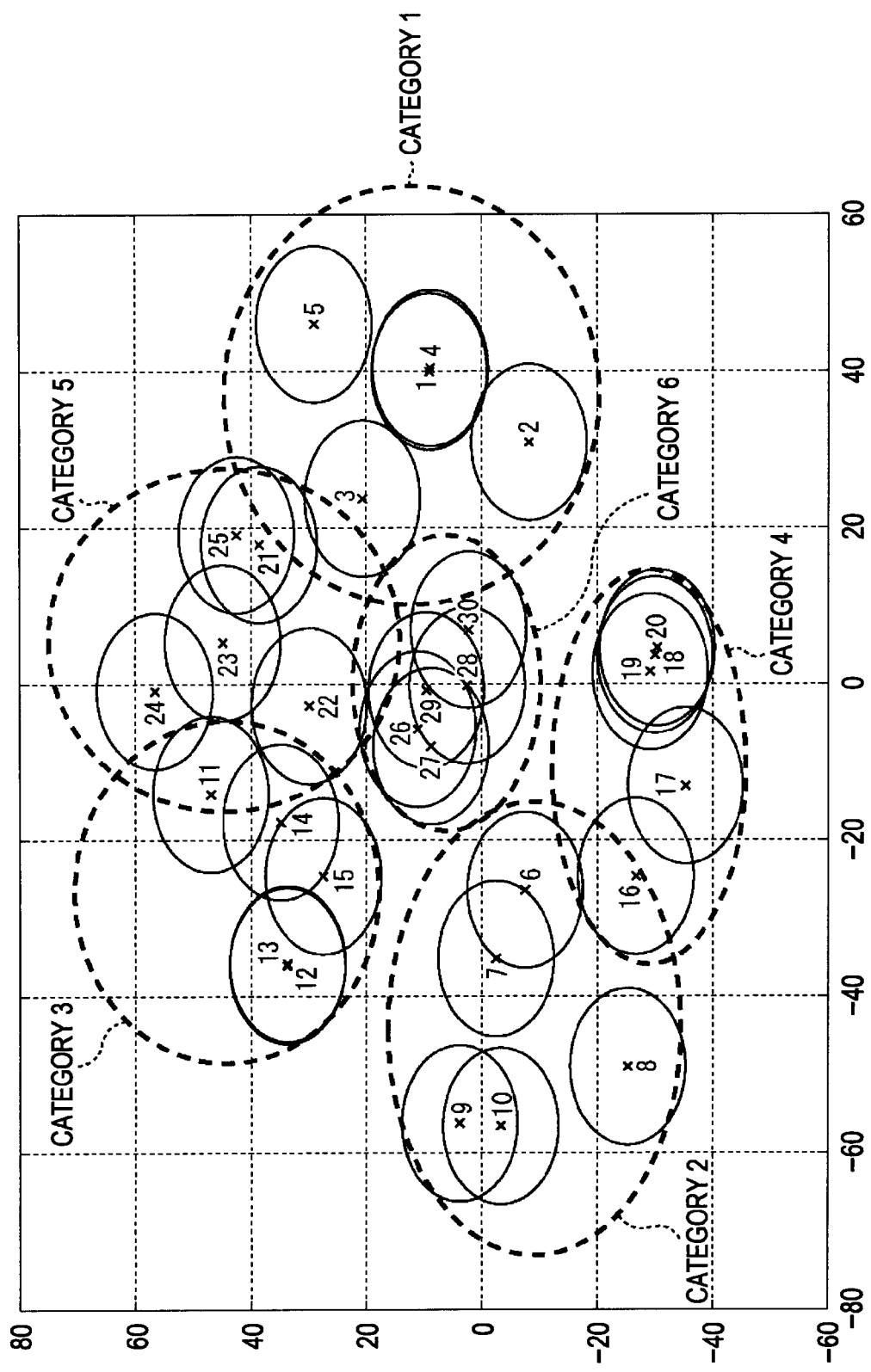
FIG. 19 is a view in which classification results are superimposed on a sammon map.

FIG. 19 shows a view in which the classification results by the pattern classification unit 111 are superimposed on a sammon map in which the weight distances among the RNNs after learning process shown in FIG. 15 are projected on a two-dimensional space.

The sammon map is a method that allows an n-dimensional input vector to be mapped onto a two-dimensional plane while maintaining relationships in the input vector space, and the detail of the sammon map is disclosed in JOHN W. SAMMON. JR., A Nonlinear Mapping For Data Structure Analysis, IEEE TRANSACTIONS ON COMPUTERS, VOL. C-18, No. 5, MAY 1969.

In FIG. 19, cross-out marks (x) suffixed with number indicate a position of the RNN#i corresponding to that number i on the sammon map. Then, a distance between cross-out marks reflects the weight distance between RNNs. Note that narrow-line circles surrounding cross-out marks each indicate a range in which the weight distance is 10 in order to easily recognize how much the weight distance between RNNs is close. For example, the weight matrices $w_{18}$ to $w_{20}$ of the RNN#18 to RNN#20 located around a position that the value of the abscissa axis is 0 and the value of the ordinate axis is −40 on the sammon map almost coincide with one another.

On the other hand, in FIG. 19, six large circles indicated by wide dotted line show the results when pattern classification unit 111 performs classification with a specification such that the weight matrices $w_1$ to $w_{30}$ of the learned 30 RNN#1 to RNN#30 are classified into six categories. The employed classification algorithm is a k-means method.

According to the classification results indicated by the wide dotted-line large circles, the 30 RNN#1 to RNN#30 are classified so that one category (category 1) contains the RNN#1 to the RNN#5, one category (category 2) contains the RNN#6 to the RNN#10, one category (category 3) contains the RNN#11 to the RNN#15, one category (category 4) contains the RNN#16 to the RNN#20, one category (category 5) contains the RNN#21 to the RNN#25, and one category (category 6) contains the RNN#26 to the RNN#30. That is, because classification is performed so that five RNNs that have learned the same action pattern are contained in the same category, it appears that the learning modules are appropriately classified.

As described above, according to the learning device 101 shown in FIG. 12, it is possible to obtain a pattern learning model having both scalability and generalization capability at a time, and the learning modules $10_i$ (patterns, such as time-series patterns and dynamics, learned by the learning modules $10_i$) may be appropriately classified without supervision on the basis of the characteristic of a time-series pattern or dynamics.

That is, by taking the above described equations of states y=Cx+Du and x'=Ax+Bu (x' denotes the derivative of x), for example, in classification (unsupervised classification) based on a Euclidean distance of a time-series pattern output from each learning module and performed by a Mixture of RNN Expert, an RNN-SOM, an HMM-SOM, or the like, classification is performed on the basis of similarities of outputs y, and classification is not the originally desired one, that is, classification is performed on the basis of similarities of constants A, B, C and D, which are model parameters, (it is difficult to perform classification on the basis of similarities of constants A, B, C and D). However, according to the learning device 101, it is possible to perform classification on the basis of similarities of constants A, B, C and D that represent the characteristic of a time-series pattern or dynamics.

The above described series of processes may be implemented by hardware or may be implemented by software. When the series of processes are executed by software, a program that constitutes the software is installed onto a general-purpose computer, or the like.

Figure 20:
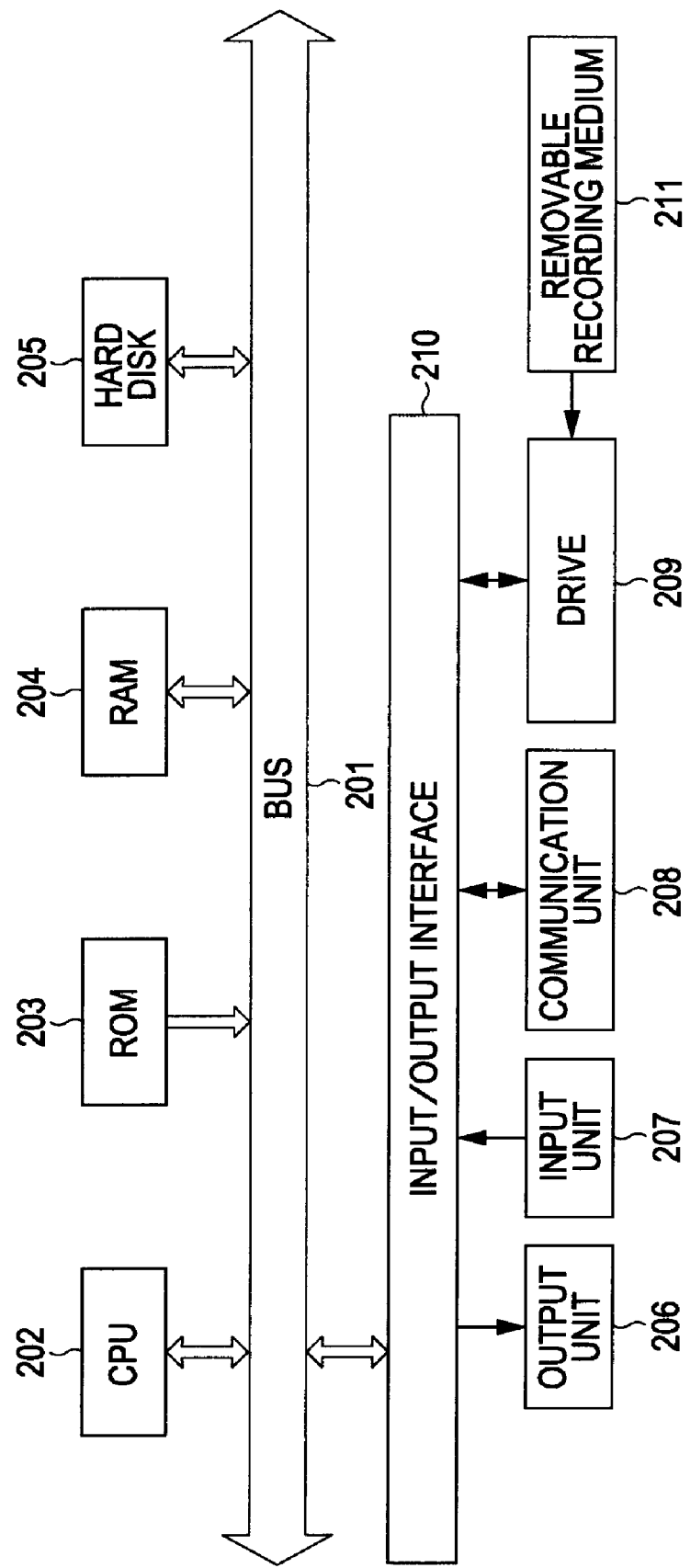
FIG. 20 is a block diagram that shows a configuration example of a computer according to an embodiment of the invention.

Then, FIG. 20 shows a configuration example of one embodiment of a computer to which a program that executes the above described series of processes are installed.

The program may be recorded in advance in a hard disk 205 or a ROM 203, which serves as a recording medium, provided in the computer.

Alternatively, the program may be temporarily or permanently stored (recorded) in a removable recording medium 211, such as a flexible disk, a CD-ROM (Compact Disc Read Only Memory), a MO (Magneto Optical) disk, a DVD (Digital Versatile Disc), a magnetic disk, and a semiconductor memory. The above removable recording medium 211 may be provided as a so-called packaged software.

Note that the program may be not only installed from the above described removable recording medium 211 onto the computer, but also transferred from a download site through a satellite for digital satellite broadcasting onto the computer by wireless communication or transferred through a network, such as a LAN (Local Area Network) and the Internet, onto the computer by wired communication, and the computer may receive the program transferred in that way by a communication unit 208 to install the program onto the internal hard disk 205.

The computer includes a CPU (Central Processing Unit) 202. An input/output interface 210 is connected to the CPU 202 via a bus 201. As a command is input through an input unit 207, formed of a keyboard, a mouse, a microphone, or the like, operated by the user through the input/output interface 210, the CPU 202 executes the program stored in the ROM (Read Only Memory) 203 in accordance with the user's operation. Alternatively, the CPU 202 loads the program stored in the hard disk 205, the program transferred from a satellite or a network, received by the communication unit 208 and then installed onto the hard disk 205, or the program read from the removable recording medium 211 mounted on the drive 209 and then installed onto the hard disk 205, onto the RAM (Random Access Memory) 204 and then executes the program. Thus, the CPU 202 performs the process in accordance with the above described flowchart or performs the process performed by the configuration shown in the above described block diagram. Then, the CPU 202, where necessary, outputs the processing result from an output unit 206 formed of, for example, an LCD (Liquid Crystal Display), a speaker, or the like, through the input/output interface 210, or transmits the processing result from the communication unit 208, and then records the processing result in the hard disk 205.

Here, in the specification, process steps that describe a program for causing the computer to execute various processings are not necessarily processed in time sequence in the order described as the flowchart, but also include processes that are executed in parallel or separately (for example, parallel process or process using an object).

In addition, the program may be processed by a single computer or may undergo distributed processing by a plurality of computers. Furthermore, the program may be transferred to a remote computer and then executed.

Note that, the embodiment of the invention is not limited to the above described embodiment and may be modified into various forms without departing from the scope of the invention.

In the above described example, classification is performed by learning time-series data of sensor inputs and motor outputs of the mobile robot 141 as time-series patterns; however, time-series data for which learning and classification are performed are not limited to them. The time-series data may be, of course, time-series data of a user input through a user interface of a computer, time-series data related to music data and image data, time-series data of audio, such as a phoneme, language, a sentence, and the like, in language processing.

The present application contains subject matter related to that disclosed in Japanese Priority Patent Application JP 2008-178807 filed in the Japan Patent Office on Jul. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning device comprising:
a processor and at least one non-transitory computer readable medium encoded with program instructions;
a plurality of learning modules, each of which performs update learning to update a plurality of model parameters of a pattern learning model that learns a pattern using input data;
model parameter sharing unit that causes, using the processor, two or more learning modules from among the plurality of learning modules to share the model parameters; and
classification unit that classifies the plurality of learning modules on the basis of the plurality of model parameters of each of the learning modules after the update learning,
wherein the model parameter sharing unit corrects the model parameters updated by each of the two or more learning modules using a weight average value of the model parameters updated respectively by the two or more learning modules to thereby cause the two or more learning modules to share the model parameters updated respectively by the two or more learning modules.

2. The learning device according to claim 1, wherein the pattern learning model is a model that learns a time-series pattern or dynamics.

3. The learning device according to claim 1, wherein the pattern learning model is an HMM, an RNN, an FNN, an SVR or an RNNPB.

4. The learning device according to claim 1, wherein the model parameter sharing unit causes all or a portion of the plurality of learning modules to share the model parameters.

5. The learning device according to claim 1, wherein the model parameter sharing unit causes two or more learning modules from among the plurality of learning modules to share all or a portion of the plurality of model parameters.

6. A learning method, the method performed by a computer system comprising a processor and a memory encoded with program instructions that, when executed by the processor, cause the system to perform the method, the method comprising the steps of:
performing update learning to update a plurality of model parameters of a pattern learning model that learns a pattern using input data in each of a plurality of learning modules;
causing, by a model parameter sharing unit, two or more learning modules from among the plurality of learning modules to share the model parameters; and
classifying the plurality of learning modules on the basis of the plurality of model parameters of each of the learning modules after the update learning,
wherein the model parameter sharing unit corrects the model parameters updated by each of the two or more learning modules using a weight average value of the model parameters updated respectively by the two or more learning modules to thereby cause the two or more learning modules to share the model parameters updated respectively by the two or more learning modules.

7. A non-transitory computer readable medium comprising a program, the program being operable, when executed by a computer system, to cause the computer system to perform a method, the method comprising the steps of:
performing update learning to update a plurality of model parameters of a pattern learning model that learns a pattern using input data in each of a plurality of learning modules;
causing, by a model parameter sharing unit, two or more learning modules from among the plurality of learning modules to share the model parameters; and
classifying the plurality of learning modules on the basis of the plurality of model parameters of each of the learning modules after the update learning,
wherein the model parameter sharing unit corrects the model parameters updated by each of the two or more learning modules using a weight average value of the model parameters updated respectively by the two or more learning modules to thereby cause the two or more learning modules to share the model parameters updated respectively by the two or more learning modules.

* * * * *